United States Patent
Kobayashi et al.

[11] Patent Number: 5,892,515
[45] Date of Patent: Apr. 6, 1999

[54] METHOD AND APPARATUS FOR DIVIDING SHAPE EXPRESSED ON THREE-DIMENSIONAL SPACE INTO ELEMENTS

[75] Inventors: Chie Kobayashi, Ibaraki-ken; Ichiro Nishigaki, Ishioka; Yoshifumi Yamashita; Hiromitsu Moriyama, both of Yokohama; Hiromi Aoyama, Ibaraki-ken; Keiko Hoshino, Tokyo; Makoto Onodera, Ibaraki-ken, all of Japan

[73] Assignee: Hitachi, Ltd., Tokyo, Japan

[21] Appl. No.: 560,012

[22] Filed: Nov. 17, 1995

[30] Foreign Application Priority Data

Nov. 18, 1994 [JP] Japan ................................. 6-284788
Dec. 27, 1994 [JP] Japan ................................. 6-324390
May 26, 1995 [JP] Japan ................................. 7-127754

[51] Int. Cl.$^6$ ................................. G06T 17/00
[52] U.S. Cl. ................................. 345/423; 345/419
[58] Field of Search ................................. 395/119, 120, 395/123, 125, 129; 345/423, 419

[56] References Cited

U.S. PATENT DOCUMENTS 5,315,537  5/1994  Blacker ................................. 395/123 X
5,442,569  8/1995  Osano ................................. 364/578
5,522,019  5/1996  Bala et al. ................................. 395/120 X
5,553,206  9/1996  Meshkat ................................. 395/119 X

*Primary Examiner*—Cliff N. Vo
*Attorney, Agent, or Firm*—Antonelli, Terry, Stout & Kraus, LLP

[57] ABSTRACT

A shape model as an object to be analyzed and division information used to produce a finite element mesh are entered, and a recognition model is produced by allocating each edge line segmented by structural points of the shape model to any one coordinate axial direction in an orthogonal coordinate system. A mapping model is produced in which an orthogonal lattice is produced on a surface and the inside of an approximated shape model, and is displayed on a screen. The mapping model is modified by a system user in an interactive operation. A finite element mesh is generated from lattice points of the modified mapping model. The data input by the system user is processed in an input/output data processing unit, and shape model data of the object to be analyzed is produced in a shape model producing unit. Based on the division information input by the system user, a finite element mesh is generated on the shape model by a finite element mesh producing unit. The line segment allocation directions of the recognition model are displayed in a recognition model producing unit, so that an allocation direction can be modified in a recognition model modifying unit by the system user in a interactive mode. The finite element model data produced from the optimized recognition model is registered into a database.

37 Claims, 45 Drawing Sheets

14a

14b

14c

FIG. 16A
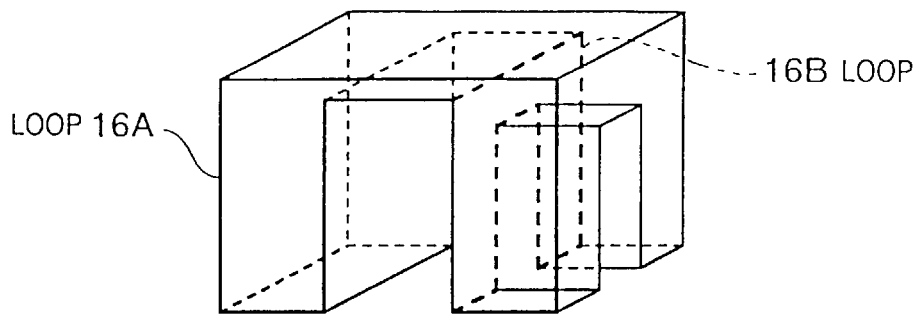
FIG. 16C
FIG. 16B
GENERATED LATTICE
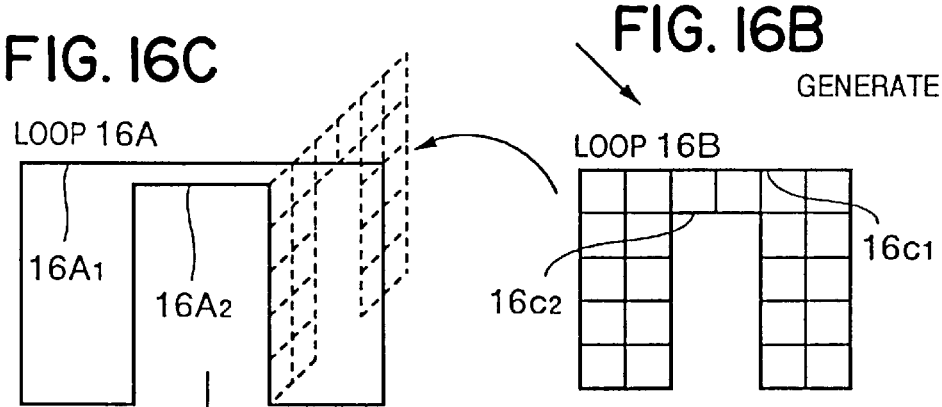
FIG. 16D
MAPPING MODEL
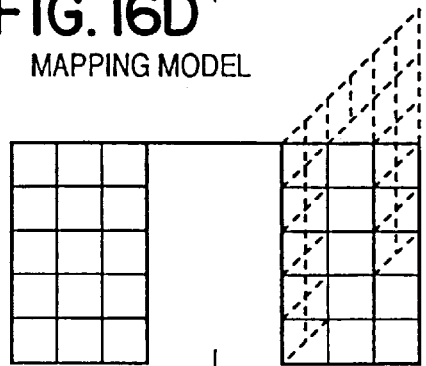
FIG. 16F
OCCURRENCE OF SECONDARY INTERFERENCE
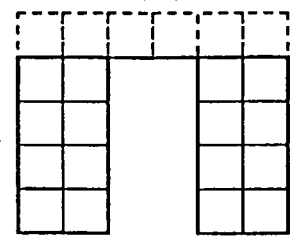
FIG. 16E
CORRECTION OF PRIMARY INTERFERENCE
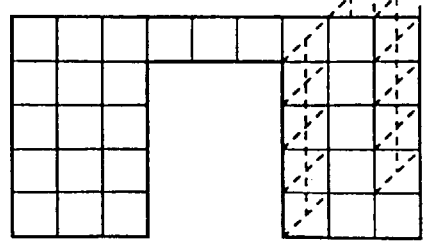
FIG. 16G
CORRECTION OF SECONDARY INTERFERENCE
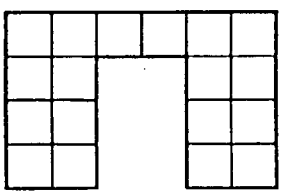

(a)

(b)

225a
225b
225c
225d

53

METHOD AND APPARATUS FOR DIVIDING SHAPE EXPRESSED ON THREE-DIMENSIONAL SPACE INTO ELEMENTS

BACKGROUND OF THE INVENTION

The present invention relates to a method and an apparatus for dividing a shape expressed on a three-dimensional space into a large number of elements. More specifically, the present invention relates to a method for capable of easily generating a finite element mesh with less distortion in an original shape model and of controlling coarse/fine characteristics of this finite element mesh without correcting the original shape model and without newly producing an auxiliary line and an auxiliary point with regard to the original shape model in the mesh generating method of the finite element model for the finite element method, and also to an apparatus into which this mesh generating method is applied.

Conventionally, there are such methods that to analyze a numeric simulation for a phenomenon in a high efficiency, a finite element mesh is produced on a shape model to be analyzed by employing the mapping method, and thus calculation precision as well as calculation efficiencies can be improved. As such a method, automatic mesh generating methods have been proposed as described in H. TAKAHASHI, et al, "A Three-Dimensional Automatic Mesh Generation System Using Shape Recognition Technique", Transactions of the Japan Society of Mechanical Engineers, Vol. 59, No. 560, April 1993, pages 279 to 285, JP-A-1-311373 and JP-A-2-236677. They are realized in, for example, the combination type mechanical system CAE (Computer Aided Engineering) system HICAD/MESH.

As a finite element mesh producing method with employment of the mapping method, there is such a method that a mesh unnecessary to a user is deleted from the pattern of a mapping model prepared by the system, to easily produce a mapping model applied to the shape model, so that calculation precision and calculation efficiency are improved. As such a method, there is a semi-automatic mesh generating method as disclosed in JP-A-5-2627.

In a conventional automatic mesh generating techniques, only an original shape model and a finite element mesh generating model as the final result are displayed on a display screen. As a consequence, a user of the system could not acquire intermediate information by intervening in a mesh generating stage. Even when the above-explained semi-automatic mesh generating method is employed, there is a limitation in applicable shapes.

On the other hand, in connection with complex matters of an original shape model, there is such a case no determination can be made as to a direction in which each line segment is to be mapped in the course of mapping onto orthogonal coordinates space, which course is a part of internal processing in the system, in order not to establish contradictory conditions with the shape model. As a result, a recognition model could not be produced, and even when a mesh is produced, the mesh may contain a very distorted element. There is another case where a mesh different from user's requirements of the system use is produced in accordance with an automatically determined mapping direction.

In the conventional system, when an intermediate model couldn't be generated, an error message is displayed on the screen to interrupt the processing. As a result, the system user has to return to the initial condition and then correct a part which caused the error in the shape model based on his experiences. Thereafter, the user either starts the mesh producing processing, or accepts the mesh generated by the system.

Even when the system user wants to correct distorted elements in a generated mesh, the user has to return to the initial condition of the mesh generating processing, in which the shape model and the division number must be modified. In accordance with the above-described method, the more the shape of a model becomes complex, the more lengthy processing time and cumbersome processing are required. On the other hand, there is another method such that some patterns of the mapping model are previously prepared and a pattern thereamong is modified in a semi-automatic manner on an element basis so as to conform to the shape model. However, such a method could not be applied to complex shape models.

As one method for solving these problems to easily and surely produce a mesh, there is a need to introduce such an interactive user intervening method by a user in order that problems occurred at a mesh producing stage during an automatic processing can be solved, and the system user can produce his desirable mesh without modifying the shape model.

SUMMARY OF THE INVENTION

An object of the present invention is to provide a method and an apparatus capable of dividing a shape expressed in a three-dimensional space into an element of a desired pattern within relatively short time.

Another object of the present invention is to provide a method and an apparatus for dividing a shape expressed in a three-dimensional space into a large number of elements, and capable of easily modifying a pattern of elements.

A further object of the present invention is to provide a method and an apparatus capable of dividing a shape expressed in a three-dimensional space into an element of a desirable pattern in a better efficiency by an interactive operation.

The above-described object may be achieved by that at an intermediate stage to divide an original shape model into a large number of elements, data about a condition used to produce elements can be entered.

The above-explained objects are featured that a shape produced at an intermediate stage for dividing a shape model into a large number of elements is displayed on a display screen, and data for modifying this displayed shape is inputted.

Concretely speaking, the above-described objects can be achieved by that at an element forming stage, a mapping model constituted by combining unit blocks with each other is displayed, and as to this mapping model, the number of unit blocks and an allocation direction to be allocated to each of line segments, corresponding to each of lines of a shape model, can be changed in an interactive operation.

It should be noted in this specification that a model implies a set of numerical data expressing a shape. A shape model implies such a model that an analyzing object formed by a system user is expressed on a three-dimensional space. A recognition model implies such a model that each of wedge lines segmented by constructing points of this shape model is transformed so as to be in parallel to any one of coordinate axial directions in the orthogonal coordinate system, and which has an equal connection relationship to each of edge lines of the shape model. A mapping model implies such a model that an orthogonal lattice is generated on a surface of the recognition model and an inside thereof. A finite element model implies such a model that the lattice points of the surface and the inside of the mapping model are mapped on the shape model, and hence are transformed into such a shape capable of being inputted into analysis by the finite element method. Furthermore, an interference portion implies such a portion that a portion which is not intersected with, or not overlapped with the shape model is intersected, or overlapped with a mapping model.

Also, an allocation direction implies such a direction of coordinate axes which should become parallel to each of line segments of a shape model when each of line segments of the shape model is mapped in an orthogonal mapping space so as to produce a recognition model. A division parameter implies a division number or a line segment allocation direction. To change a line sort, or to discriminate from other line segments imply that a width of a line, a color thereof or a solid line and a broken line are varied and/or are indicated by an arrow.

In a preferred embodiment of the present invention, after a system user selects a modification method from a menu, each of the line segments of a displayed mapping model is selected by a mouse. When a modification amount is inputted from a keyboard, the shape of the mapping model displayed on the screen is modified in response to the modification, and is again displayed. At the same time, a mesh produced on a predicted shape model corresponding to the mapping model at this time is also provisionally displayed, so that the influences of this modification is clarified. When an interference happens to occur on the mapping model and thus the mesh cannot be produced, a causing portion is discriminated from other portions by way of colors and widths thereof, which may give an attention to the system user to prompt modification.

As described above, the finite element mesh can be produced in high efficiency without directly changing the complex shape model by merely adding such an easy modification by the system user at the finite element producing stage. Then, the mesh shape and the coarse/fine characteristics can be controlled.

A preferable finite element mesh producing method according to the present invention is featured by that, in a finite element model producing method comprising: inputting division information used to produce both of a shape model to be analyzed and a finite element mesh; producing a recognition model by allocating each edge line of said shape model to any one of coordinate axial directions in an orthogonal coordinate system, while making connection relationships between edge lines of said recognition model equal to those of said shape model; producing a mapping model where orthogonal lattices are generated on a surface of said recognition model and an inside thereof; and mapping lattice points of the surface and the inside of said mapping model on said shape model to thereby generate a finite element model, the generated mapping model is displayed on a screen, and said mapping model is modified in an interactive operation, so that the production of the finite element mesh is controlled. In this case, it is preferable to employ such a means that an interference portion of the produced mapping model is displayed in a highlight mode.

Also, it is preferable to employ such a means that the generated mapping model is displayed on the screen; a wedge line of said mapping model is designated; and a dividing element number of said wedge line is entered, so that coarse/fine characteristics of the mesh are modified.

Further, it is preferable to employ such a means that the generated mapping model is displayed on the screen; an edge line of said mapping model is designated; and an increased/decreased value of a dividing element number of said wedge line is entered, so that coarse/fine characteristics of the mesh are modified.

Another preferable finite element mesh producing method according to the present invention is featured by inputting division information used to produce both of a shape model to be analyzed and a finite element mesh; producing a recognition model by allocating each edge line of said shape model to any one of coordinate axial directions in an orthogonal coordinate system, while making connection relationships between edge lines of said recognition model equal to those of said shape model; producing a mapping model where orthogonal lattices are generated on a surface of said recognition model and an inside thereof; displaying the produced mapping model on a display screen; modifying said mapping model in an interactive operation to thereby control a finite element mesh; and thereafter, mapping lattice points of a surface and an inside of the modified mapping model on said shape model to thereby produce a finite element model.

Furthermore, a preferable apparatus for designing a mechanical component, according to the present invention, corresponds to an application of the above-described finite element mesh producing method, and is featured by comprising: means for producing a shape model to be analyzed; means for inputting division information used to generate a finite element mesh; means for producing a recognition model by allocating each edge line of said shape model to any one of coordinate axial directions in an orthogonal coordinate system, while making connection relationships between edge lines of said recognition model equal to those of said shape model; means for producing a mapping model where orthogonal lattices are generated on a surface of said recognition model and an inside thereof; means for displaying the produced mapping model on a display screen; means for modifying said mapping model in an interactive operation to thereby control a finite element mesh; and means for mapping lattice points of a surface and an inside of the mapping model after modification on said shape model to thereby a finite element model.

In a preferred embodiment of the present invention, division information used to produce both of a shape model to be analyzed and a finite element mesh is inputted, a recognition model is produced by allocating each edge line of said shape model to any one of coordinate axial directions in an orthogonal coordinate system, while making connection relationships between edge lines of said recognition model equal to those of said shape model, and a mapping model is produced where orthogonal lattices are generated on a surface of said recognition model and an inside thereof. This mapping model is displayed on the screen together with the lattice quantity of each line segment, and also the lattice quantity can be changed by the system user in the interactive operation. The lattice points of the surface and the inside of this modified mapping model are mapped on the shape model to thereby produce a finite element model.

Also, in the mesh model automatic generating system, in a case that an original shape at the mesh producing stage is recognized to produce a recognition model mapped in the orthogonal coordinate space, the allocation directions of line segments when being mapped into the orthogonal coordinate space are displayed on the screen. The system user intervenes at the mapping stage to constrain or modify any allocation directions of the line segments. As a result, the shape of the recognition model is controlled to assist the automatic mesh generation. Even in such a complex shape model, the mesh can be readily formed without being interrupted by the cumbersome shape model modifying work while returned to the initial condition. Also, the shape and the arrangement of the produced mesh can be controlled.

After the system user selects a modification method from a menu, each line segment of the displayed shape model in a different color for the allocation direction is selected by a mouse. When a control direction is inputted from a keyboard, the shape of the mapping model displayed on the screen is modified in response to the modification, and is again displayed. At the same time, the mesh produced on a predicted shape model is also provisionally displayed, which corresponds to the mapping model at this time, so that an influence of this modification is clarified. When there is a line segment assigned to such a direction that connection relationships in line segments with the shape model can not be maintained on the recognition model and thus the mesh cannot be produced, a causing portion is discriminated from other portions, which may give an attention to the system user to prompt modification.

As described above, at the producing stage, a mesh for numerical analysis can be produced in high efficiency without returning to the initially set shape model by merely adding such an easy modification by the system user. Then, the shape and arrangement of the mesh can be controlled.

A preferred numerical value analyzing mesh producing method, according to the present invention, is featured by that both of shape model data to be analyzed and division control data for producing a numerical analyzing mesh are entered, a recognition model is generated by allocating each of line segments of said shape model any one of coordinate axial directions in an orthogonal coordinate system, while making connection relationships of line segments equal to those of the shape model; a mapping model is produced where an orthogonal lattice is produced on at least a surface of said recognition model; and a numerical analyzing model is produced where lattice points of said mapping model are mapped on said shape model. This method is characterized by employing such a control means that the allocation directions of respective line segments determined at the stage for producing the recognition model from the shape model are displayed on the screen. The allocation directions are constrained or changed in an interactive operation, so that numeric analyzing mesh is controlled.

In this case, it is preferable to employ such a means for changing the line sort of a line segment at a portion whose allocation direction cannot be determined without any contradictory condition. It is also preferable to employ such a means for changing the arrangement and the shape of the mesh by displaying the determined allocation direction on the shape model on the display screen, by designating a line segment of the shape model, and by constraining or changing the allocation direction of the designated line segment. Furthermore, it is preferable to employ such a means for varying the arrangement and shape of the mesh by displaying the determined allocation direction on the shape model on the screen, by designating a line segment of the shape model, and by entering a value for indicating the allocating direction of the designated line segment.

According to the present invention, since the mesh is produced, without increasing/decreasing all of the construction points set during the production of the shape model, by changing the direction and the line segment division number of the mapping model, it is not required to correct the shape model, while being returned to the initial condition.

In the preferred embodiment of the present invention, division control data is inputted which is used to produce both of a shape model to be analyzed and a mesh, a recognition model is produced by allocating a line segment of said shape model to any one of coordinate axial directions in an orthogonal coordinate system, while making connection relationships of line segments equal to those of said shape model, and a mapping mode is produced where an orthogonal lattice is generated on a surface of said recognition model and an inside thereof. The allocation directions of the respective line segments determined when the recognition model is produced from the shape model are displayed on the screen together with values indicative of allocation directions of the line segments and also with color discrimination, so that the allocation directions can be constrained and modified by way of an interactive operations by the system user. After the constraint and modification operations, the lattice points are mapped on the shape model and the surface of the mapped model generated based on the produced recognition model, to produce a mesh model.

BRIEF DESCRIPTION OF THE DRAWINGS

FIG. 12 is an explanatory diagram of an example of a loop in which self-interference occurs by reason of a pass through;

FIG. 16 is an explanatory diagram for explaining an example of secondary interference occurring by reason of correcting one interference;

DESCRIPTION OF THE PREFERRED EMBODIMENTS

Referring now to drawings, embodiments of the present invention will be described in detail.

In accordance with a typical embodiment of the present invention, a recognition model constructed of only line segments parallel to orthogonal coordinate axes is displayed on a screen as a mapping model divided into a set of unit cubes. The recognition model is produced in the course where a three-dimensional solid shaped model is subdivided into a finite element by employing the curved line coordinate transforming method. Then, this mapping model is modified and/or altered by way of an interactive operation so that roughness/fine characteristics of a finite element mesh are controlled. One embodiment of the typical embodiments will now be explained with reference to FIG. 1 to FIG. 6.

Figure 1:
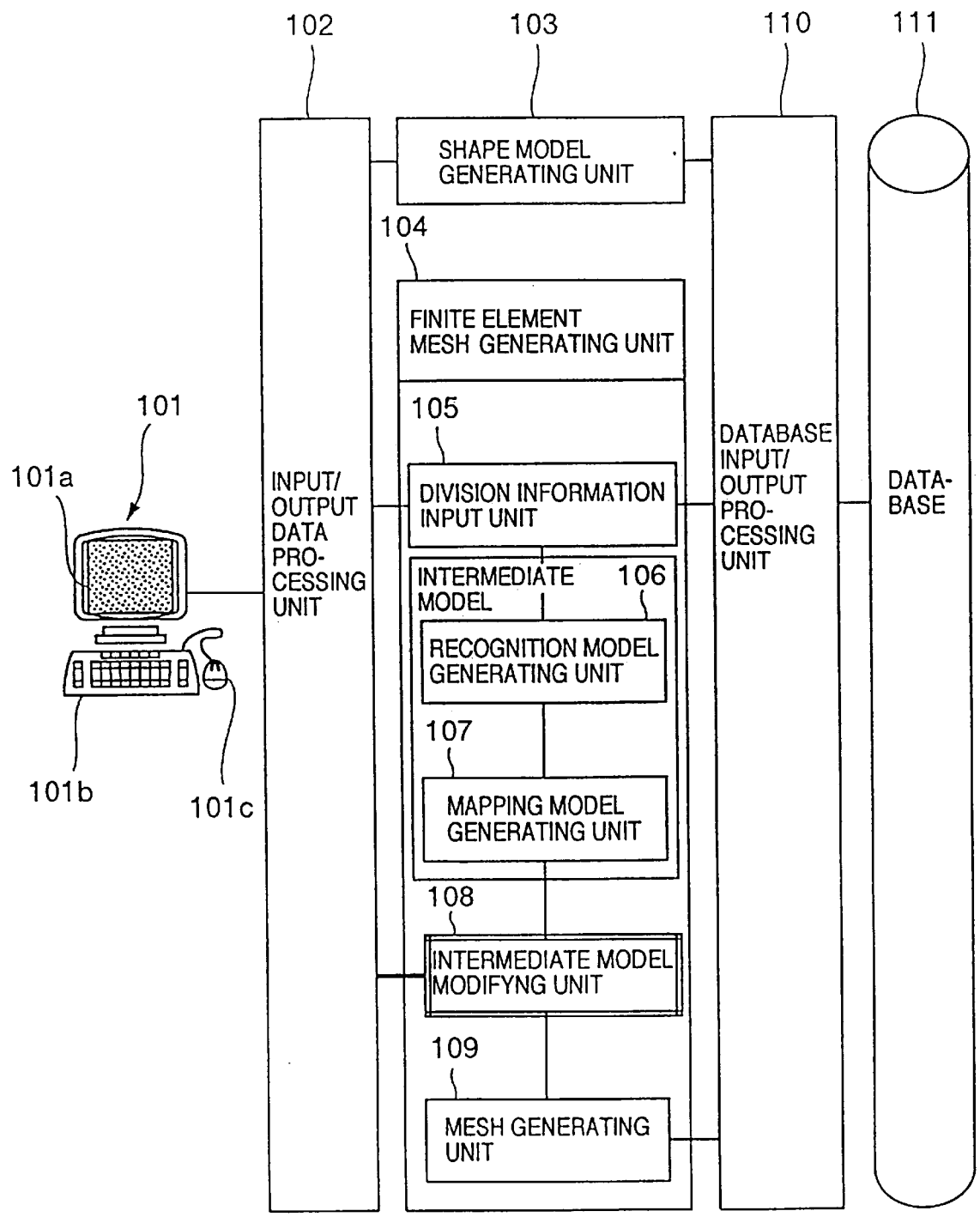
FIG. 1 schematically shows an arrangement of a system for carrying out the present invention.

FIG. 1 schematically shows a system arrangement used to realize this embodiment.

This system is mainly arranged by an input/output apparatus 101, an input/output data processing unit 102 connected to the input/output apparatus 101, and a shape model generating unit 103 and a finite element mesh generating unit 104, which are connected to this input/output data processing unit 102. The system is further comprised of a database input/output processing unit 110 connected to both of the shape model generating unit 103 and the infinite element mesh generating unit 104, and a database 111 connected to this database input/output processing unit 110.

The input/output apparatus 101 is mainly arranged by a CRT display 101a for displaying a shape model and a mapping model, a keyboard 101b for producing a model, for entering a numerical value, and for modifying a model by a user of this system, and also a mouse 101c. The input/output data processing unit 102 connected to the input/output apparatus 101 analyzes and processes data entered by the user of the system via the input/output apparatus 101.

The shape model generating unit 103 generates a shape model entered by the system user based upon the data processed in the input/output data processing unit 102. The finite element mesh generating unit 104 generates a finite element mesh for this shape model. The database input/output processing unit 110 processes the data generated from the respective generating units in order that the processed data can be stored.

The shape model generating data which has been inputted by the system user by employing the keyboard 101b and the mouse 101c of the input/output apparatus 101 is processed in the input/output data processing unit 102. Next, after the shape model data has been formed by the shape model generating unit 103, this shape model data is stored via the database input/output processing unit 110 into the database 111.

The finite element mesh generating unit 104 for generating the finite element mesh in this shape model is constructed of a division information input unit 105 for determining an element unit; a recognition model generating unit 106 for generating such a recognition model whose edge or ridge line connecting relationship is equal to that of the shape model in which each of the respective ridge lines segmented by constructive points of this shape model have been allocated to any one of coordinate axis directions in the orthogonal coordinate system; and a mapping model generating unit 107 for generating such a mapping model in which orthogonal lattices are produced on the surface and inside of this recognition model. This finite element mesh generating unit 104 is further arranged by a mapping model modifying unit 108 for displaying the produced mapping model on the display screen so as to be modified by way of an interactive operation; and a mesh generating unit 109 for mapping the lattice points of the surface and inside of the modified mapping model on the shape model to thereby produce a finite element model.

The division information data entered by the system user by employing the keyboard 101b and the mouse 101c of the input/output apparatus 101 is processed by the input/output data processing unit 102, and thereafter the processed divisional information data is stored via the database input/output processing unit 110 into the database 111. Also, the mapping model generated by the mapping model generating unit 107 in the stage of the finite element mesh generating unit 104 is displayed on a CRT display 101a through the input/output data processing unit 102 by the mapping model modifying unit 108. When the displayed information is modified by the system user by way of the keyboard 101b and the mouse 101c, the modified data is again processed via the input/output data processing unit 102 by the mapping model modifying unit 108. As a result, a produced mapping model is again displayed on the CRT display 101a. When no modification is made by the system user, the finite element mesh is generated on the shape model by the mesh generating unit 109 based on this mapping model, so that mesh data is stored via the database input/output processing unit 110 into the database 111.

It should be noted that a medium to be supplied to the system user in order to realize this system may be available in the form of a DAT, a magnetic tape, or a floppy disk.

Figure 2:
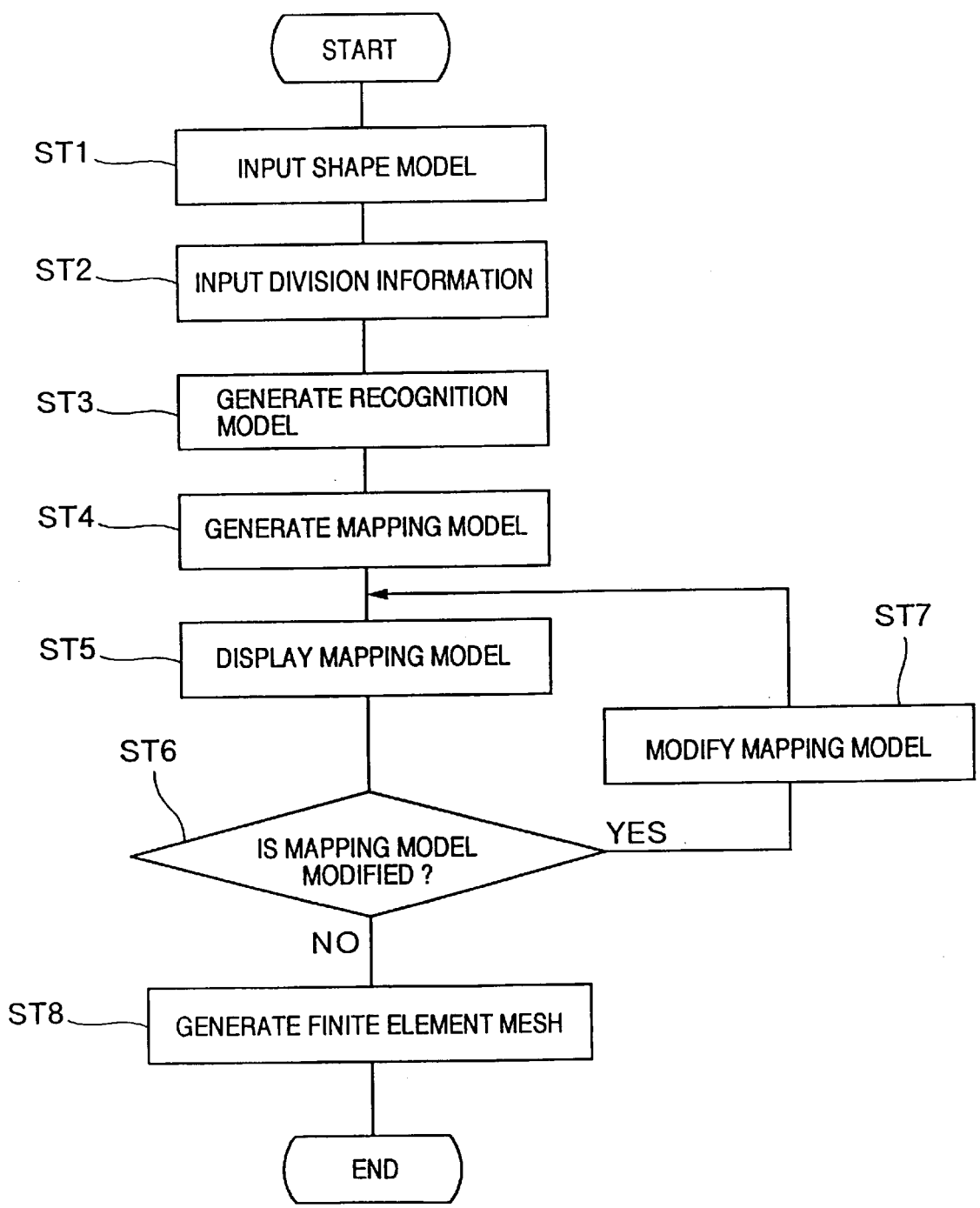
FIG. 2 is an overall flow chart for explaining a mesh generating method according to the present invention.

FIG. 2 is a flow chart for explaining an overall method to generate a finite element mesh according to this embodiment. FIGS. 3 to 6 represent models generated at the respective stages of this method. While making correspondence relationships among them, a description will now be made of the method for generating the finite element, constituting a major feature of this embodiment.

(1). A shape model constituting an object to be analyzed according to the finite element method is set (ST1, for instance, numeral 3 of FIG. 3). The setting of the shape model is carried out by the input/output apparatus 101. The shape model is generated in the shape model generating unit 103.

(2). After the division information used to generate the ignite element mesh is entered into the division information input unit 105 in the finite element mesh generating unit 104 (ST2), such a model is generated from the shape model. This generated model is featured by being arranged by only line segments parallel to the orthogonal coordinate axis, and is topologically equal to the original shape (namely, positional relationships of line segments are identical to each other), and also is mostly approximated to the shape model in view of geometry. The resultant model will be referred to as a "recognition model" hereinafter (ST3, being performed in the recognition model generating unit 106. If numeral 3 of FIG. 3 corresponds to the shape model, then the recognition model corresponds to numeral 4 of FIG. 4).

(3). Based upon the division information, the recognition model is fine-adjusted in such a manner that this recognition model is arranged only by line segments whose lengths are integer-multiple of length of a unit element, and thereafter an orthogonal grid is produced in the recognition model to thereby produce a mapping model (ST4, being performed in the mapping model generating unit 107. If the model shown in FIG. 4 corresponds to the recognition model, then the mapping model corresponds to numeral 5 of FIG. 5).

At this time, the mapping model is displayed on the screen (ST5), and this mapping model may be modified by way of the interactive operation (ST6 to 7, the modification of the mapping model is carried out in the mapping model modifying unit 108).

(4). Based on the correspondence relationship between the grid of the boundary of the mapping model obtained in the above-described step (3) and the lattice of the shape model, a grid topologically equal to the lattice of the mapping model is generated inside the shape mode, so that a finite element mesh model is generated (ST8, being performed by the mesh generating unit 109. If numeral 5 of FIG. 5 corresponds to the mapping model, then the finite element mesh model corresponds to numeral 6 of FIG. 6). It should be understood that the expression "topologically equal" implies as follows: As to all of the unit blocks constituting a mapping model (intermediate model), positional or arrangement relationship between adjoining unit blocks is identical to the positional or arrangement relationship between the elements of a finite element mesh model.

The steps as to the above-described items (2) and (3) will now be described more in detail.

Figure 7:
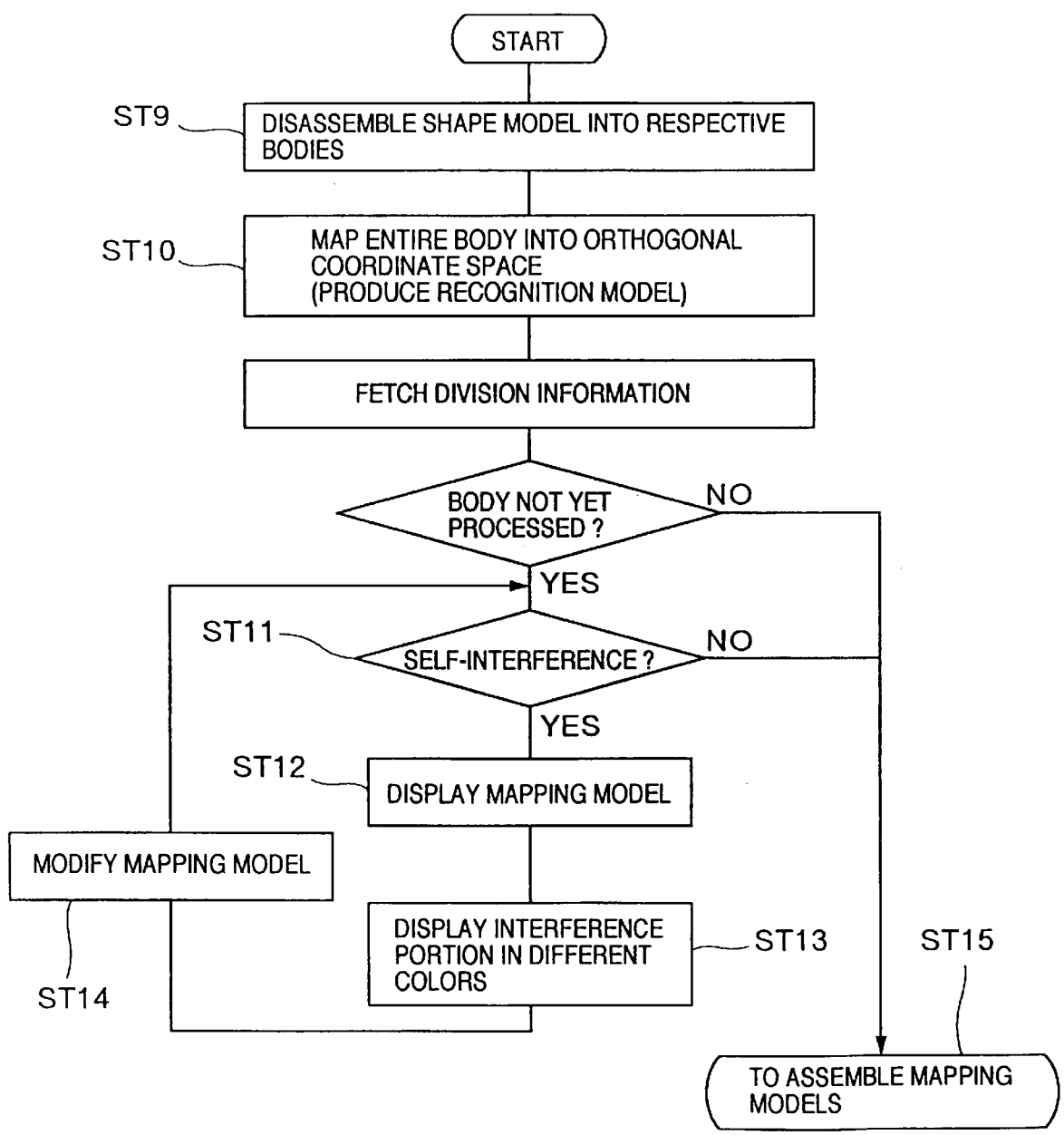
FIG. 7 is a flow chart for explaining steps to generate a mapping model for each body.

FIG. 7 shows a detailed flow chart operation about a front half stage to generate a mapping model.

Figure 3:
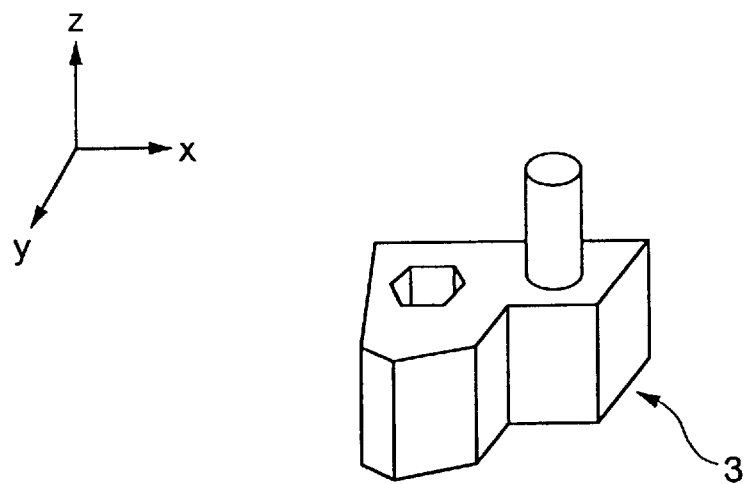
FIG. 3 is an explanatory diagram of an example of a three-dimensional shape model to be analyzed.
Figure 4:
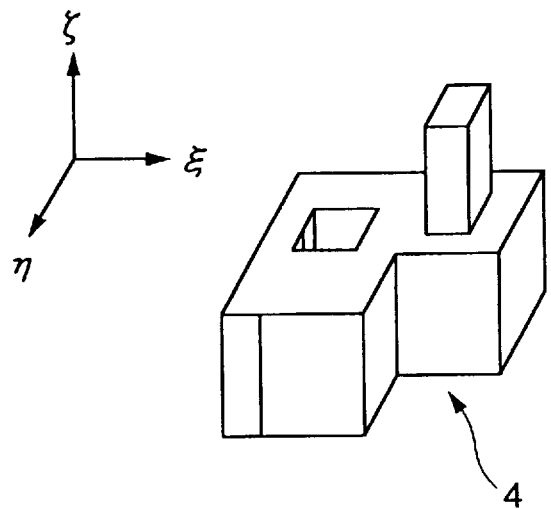
FIG. 4 is a recognition model diagram produced from the shape model of FIG. 3.
Figure 5:
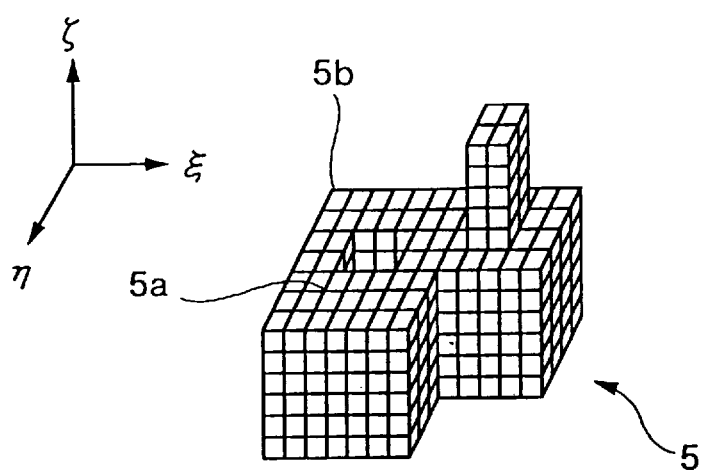
FIG. 5 is a mapping model diagram formed from a recognition model on which an orthogonal lattice is produced.
Figure 6:
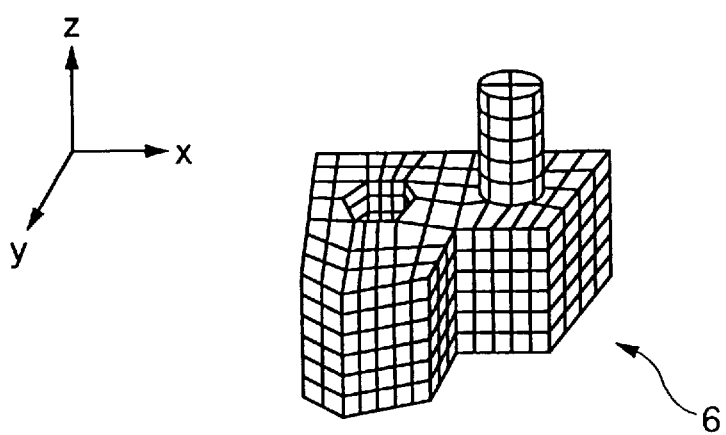
FIG. 6 is a finite element mesh model diagram produced based on the mapping model of FIG. 5.
Figure 8:
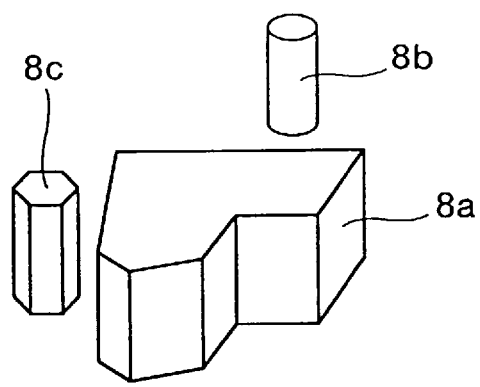
FIG. 8 is a explanatory diagram for indicating such a condition that the shape model of FIG. 3 is disassembled into bodies.
Figure 9:
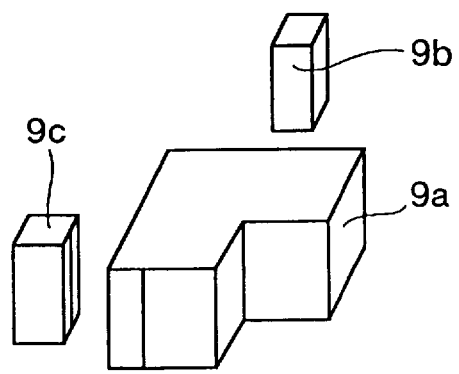
FIG. 9 is a recognition model diagram for showing recognition models produced from the shape model of FIG. 8 for each body.

In the above item (2), a recognition model is generated by disassembling the shape model into units of "bodies". To this end, the shape model to be firstly analyzed is disassembled into bodies (ST9). A "body" implies a set of line segments having a connection relationship within a shape model, and corresponds to a minimum portion shape constructed only by such a loop that other closed loops are not contained in its own closed loop. For instance, in the case of such a shape model as indicated by numeral 3 of FIG. 3, this shape model is disassembled into a hole shape and a projection shape as represented in numerals 8a to 8c of FIG. 8. The recognition model is generated for each of the bodies (namely, the entire bodies are mapped in the orthogonal coordinate space to generate the recognition models, ST10. If the model of FIG. 3 is equal to the shape model, then numerals 9a to 9c of FIG. 9 indicate the recognition models).

In the above item (3), the mapping model is mainly subdivided into two stages, namely the first stage where a mapping model is generated with respect to each body, and the second stage where the generated mapping models of the respective bodies are assembled. As a consequence, in accordance with this embodiment, it is featured that the entire stage is constructed of two stages capable of performing a primary modification and a secondary modification in order that the mapping models generated at the respective stages can be displayed on the respective screens so as to be modified and altered. FIG. 7 represents a flow operation executed until the mapping models for the respective bodies are generated.

Figure 10:
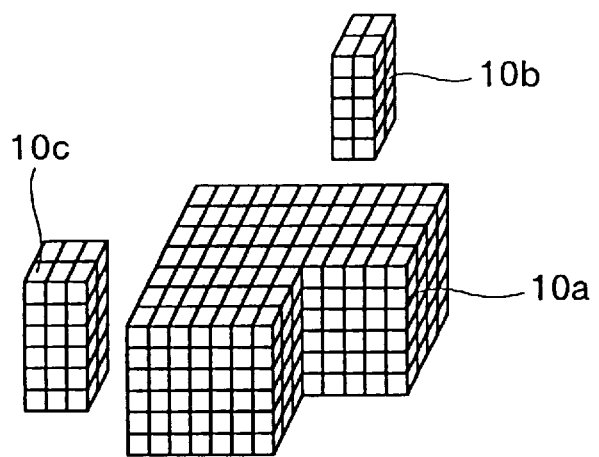
FIG. 10 s a mapping model diagram for showing a mapping model made by producing an orthogonal lattice on the recognition model of FIG. 9 for each body.

At the stage for generating the mapping model, line segments for constituting each of the bodies are firstly fine-adjusted based on the division information in such a manner that the lengths of these line segments become longer than the length of the unit element by an integer multiple. Thereafter, the orthogonal lattice is generated on the recognition model of the all bodies to thereby generate the mapping models for each of these bodies (If numeral 3 of FIG. 3 is indicated by a series of shape models, then they are numerals 10a to 10c of FIG. 10).

Figure 11:
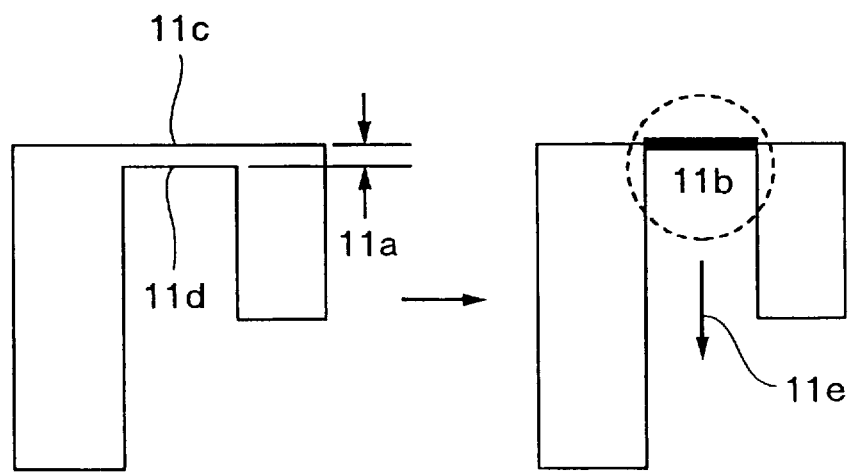
FIG. 11 is an explanatory diagram of an example of a loop in which self-interference occurs by reason of a narrow part.
Figure 12:
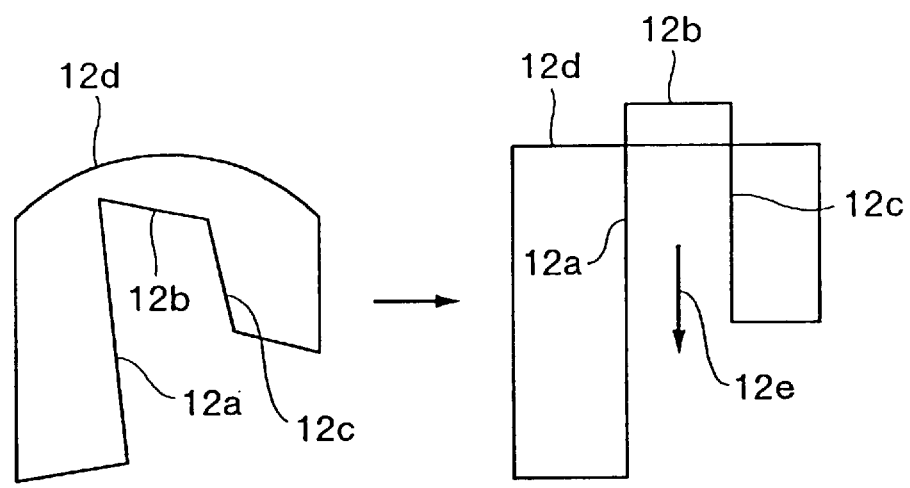

However, when the recognition models of the respective bodies are fine-adjusted to become longer than the length of unit element by an integer multiple, there are some possibilities that a self-interference portion which cannot be established as a shape happens to occur. FIG. 11 and FIG. 12 show an example of such loops in which self-interference happens to occur in a two-dimensional manner. A shape model located at the left side of FIG. 11 contains a very narrow portion (11a). If the above-explained fine adjustment is made on such a recognition model obtained from the shape model which involves such a smaller portion than the length of the unit element, then a portion (11b) whose distance is equal to 0 would be produced, so that a normal mapping model could not be produced.

Also, in the case of such a concave shape model containing a curved line of FIG. 12, if it is mapped in the orthogonal coordinate space, then a portion constructed of 12a to 12c would penetrate through a line segment 12d, as viewed in the right side of FIG. 12. Thus, no normal mapping model cannot be produced.

However, if the mapping model is modified, then the above-described interference can the avoided. In the case of FIG. 11, the line segment 11d overlapped with the line segment 11c is moved along an arrow direction 11e by one unit block, so that a portion corresponding to the very narrow portion 11a can be constructed and thus the mapping model can be produced. Similar to the case of FIG. 12, the line segment 12b penetrating through the line segment 12d is moved along an arrow direction 12e by at least two unit blocks, so that the interference can be avoided.

Thus, to alter the primary mapping model, when the mapping models for the respective bodies are generated, a search is made as to whether or not self-interference happens to occur in all of the loops for constituting the respective bodies. When a body contains the loop containing even one interference (ST11), the objective body is displayed on the display screen with the interference condition (ST12). After this mapping model is modified or altered to become a normal shape by the system user by operating the mouse and the keyboard, the process operation is advanced to the step for assembling the mapping models. It should be noted that after the step ST10, the division information is fetched, and if a body is not yet processed, then the processing is advanced to the step ST11.

Figure 13:
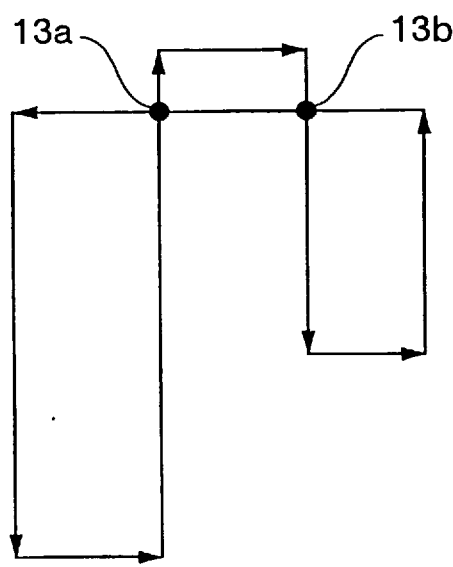
FIG. 13 is an explanatory diagram for representing a loop in a counterclockwise direction.

As one of the self-interference judging methods, there is such a method that the respective loops are traced along the counterclockwise direction as indicated in FIG. 13, in order to search portions at which any line segments and constructive points that neither intersect, not touch with each other become intersecting or contacting with each other as a result of producing a mapping model. Judgement is made as to whether or not there is a constructive point (13a or 13b) which has passed twice.

Figure 14A:
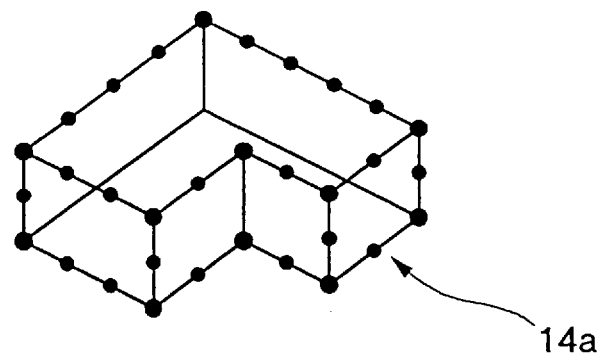
FIGS. 14A, 14B and 14C are explanatory diagrams for explaining an example of dividing number display methods for the respective line segments of a mapping model.
Figure 14B:
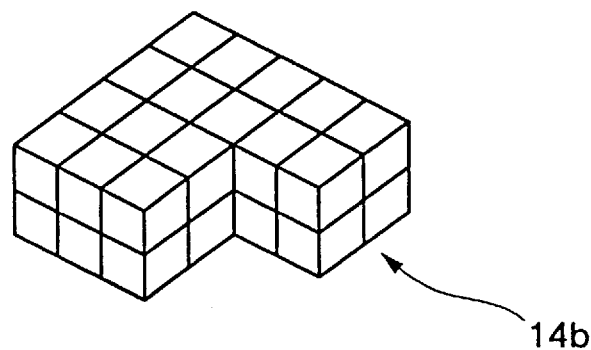
Figure 14C:
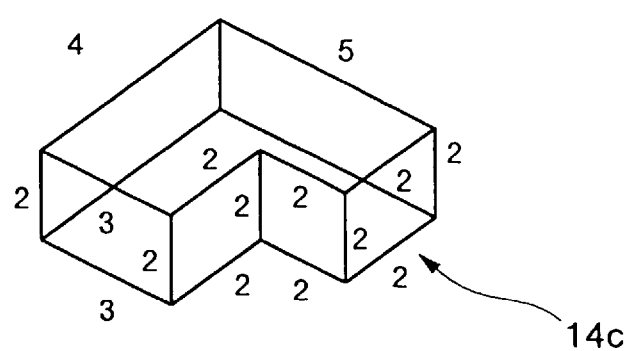
Figure 15A:
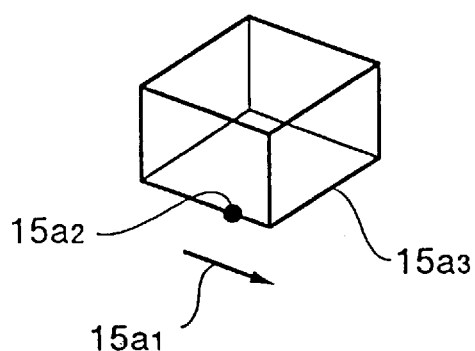
FIG. 15 is an explanatory diagram for explaining an example of basic modifying methods for a displayed mapping model.
Figure 15B:
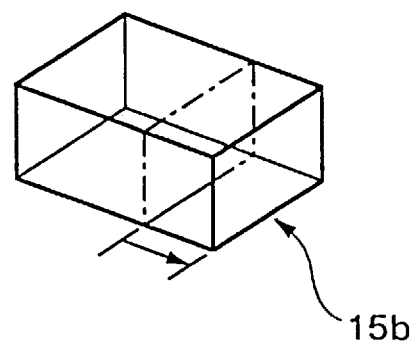
Figure 15C:
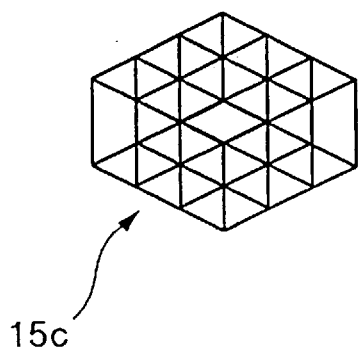
Figure 15D:
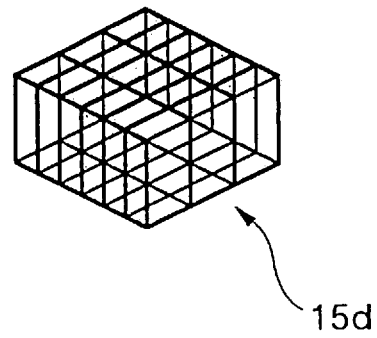

As a method for displaying a body to be modified, such a method is employed in order to clearly indicate an instruction to alter a mapping model to the system user, in which an orthogonal lattice condition of the mapping model is displayed, or an interference portion is indicated in different colors. As to the orthogonal lattice condition, as illustrated in FIG. 14A to FIG. 14C, only lattice points appearing on the respective line segment may be displayed (see FIG. 14A), the lattice itself may be displayed (see FIG. 14B), or the division number (lattice quantity) of the respective line segments may be displayed as numerical values (see FIG. 14C). Also, an interference portion detected by the above-described searching method and the like may be displayed in such a manner that color of relevant line segment (for example, line segment 11d of FIG. 11) or a relevant loop is changed, or the widths thereof are varied in order that the portions to be modified/altered are made clear (display of an interference portion in different color is defined at ST13 of FIG. 7).

In FIG. 15, there is three-dimensionally represented a typical modifying method for a displayed mapping model. The system user selects by the mouse an arbitrary point (point "a2" of FIG. 15) of a mapping model (a) not yet altered, which is displayed on the screen. This arbitrary point is located at a side along a desirable altering direction (an arrow "a1" of FIG. 15) from a middle point of a line segment to be altered. The system user enters a desirable altering amount from the keyboard by way of an integer value. When this altering amount becomes positive, the lattice number of the selected line segment is increased, whereas when this altering amount becomes negative, the lattice number is decreased. In accordance with the operations of the system user, the shape of the mapping model displayed on the screen is altered as illustrated in (b). At the same time, the coarse/fine characteristics of the finite element mesh generated on the shape model are changed from (c) to (d) by the altering amount. At this time, the position selected by the mouse may be selected by employing such a method for selecting the line segment ("a3" of FIG. 15) perpendicular to the desirable alteration direction. Also, if a plurality of line segments are to be altered along the same direction by the same amounts, then the line segments may be selected once as an alteration object.

As one of the above-described methods for avoiding the interference as shown in FIG. 12, an upper half portion of the line segment 12a is selected by the mouse on the display screen, and then a negative value may be entered.

On the other hand, a care should be taken when such a penetration as in FIG. 12 is modified. This is because a secondary penetration may occur when the penetration of a certain portion is modified. Such a sample is illustrated in FIG. 16.

It is now assumed that a mapping model of a shape model shown in FIG. 16(a) is produced as (a), (b), (c) and (d). A line segment 16A1 on a loop 16a interferes with a line segment 16A2 on this loop 16A. To modify this interference, the line segment 16A2 is altered by one lattice (1 unit block) toward the lower direction of the display screen (see "e"). On the other hand, at this time, when a lattice generated on the loop 16B is indicated as (b), another line segment 16C1 is altered by the same amount as one lattice, which segment is connected to the line segment 16A2 lowered so as to modify the loop 16A. As a consequence, since another interference is newly produced between line segments 16C1 and 16C2, as shown in (f), the interference avoiding operation must be similarly performed with respect to the loop 16B in a similar manner to the loop 16A. That is, this loop 16B must be modified as illustrated in (g).

As described above, in order not to mistakenly search the secondary inference caused by a certain alteration, the interference retrieve of the entire loop within the body is executed every time the system user alters the mapping model (ST14 of FIG. 7).

When no self-interference is made as to all of the bodies and thus the normal mapping models can be produced, the process operation is advanced to a stage for assembling the produced mapping models (ST15 of FIG. 7).

Figure 17:
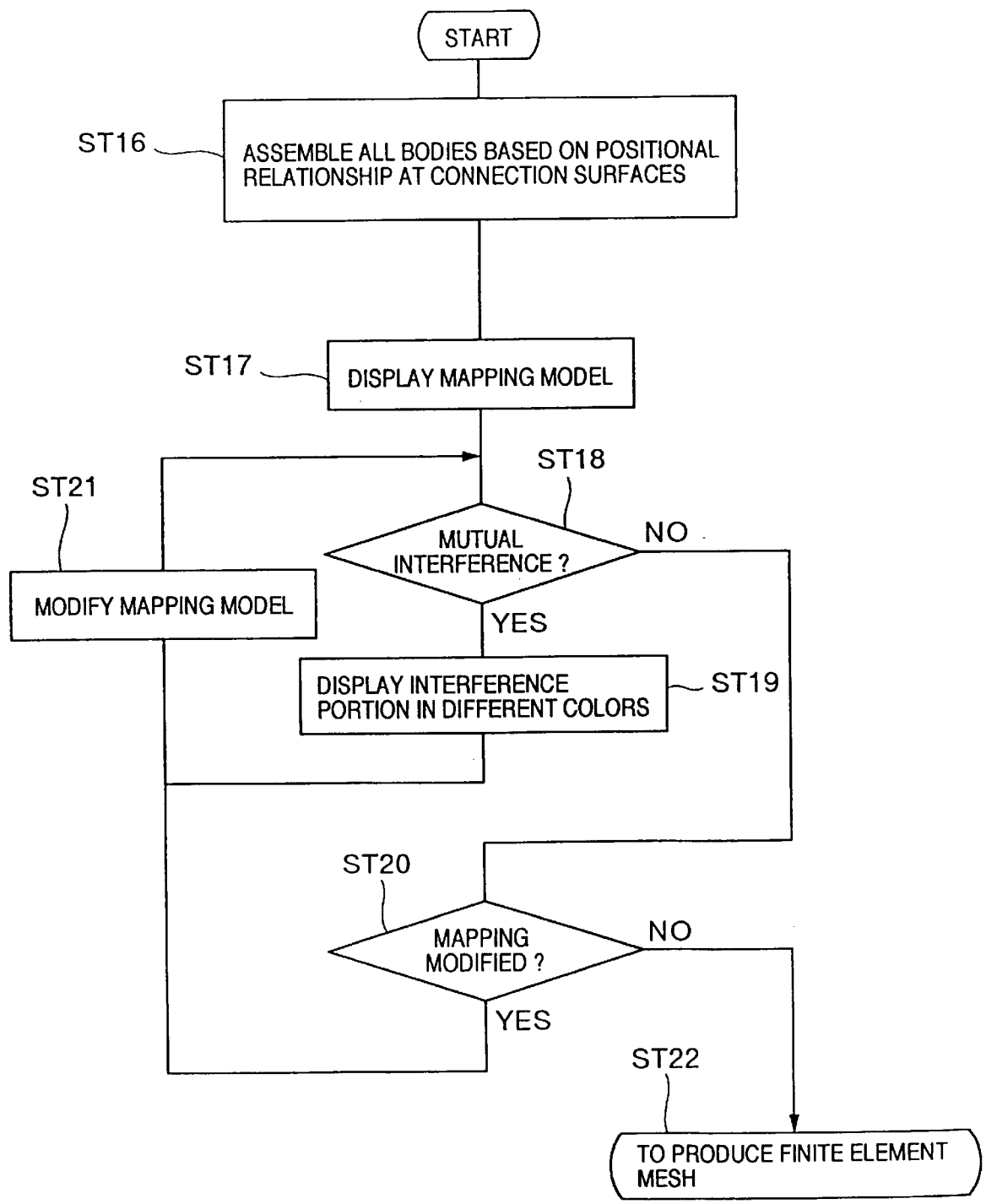
FIG. 17 is a flow chart for describing a method for assembling mapping models generated with respect to the respective bodies.

FIG. 17 is a flow chart for explaining the assembling of mapping models. The mapping models are assembled based upon positional relationships of connection surfaces of each body (ST16). It should be noted that connection surfaces correspond to surfaces where bodies before being disassembled were connected to each other, and may imply such a surface as shown by numeral "5a" of FIG. 5. The loop 5b located at an outermost position within this surface is called as an outer loop, whereas an inner loop thereof is called as a joint loop.

Because a mapping model is assembled three-dimensionally from such a two-dimensional positional relationship as a surface, even when each of the bodies is a normal mapping model, there are some possibilities that self-interference or mutual interface between bodies would occur in an assembled model. Such interference examples are illustrated in FIG. 18 to FIG. 21.

Figure 18:
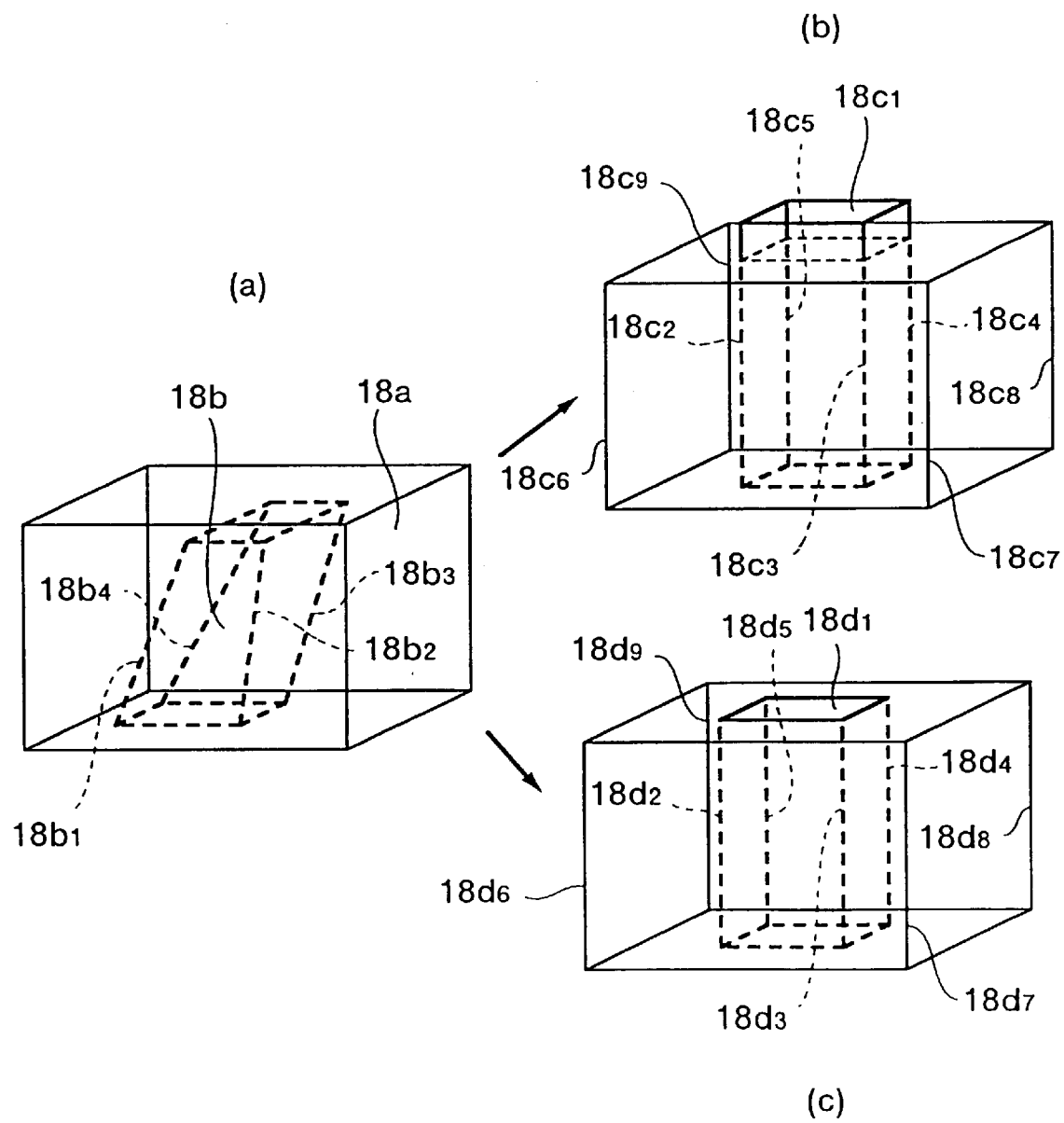
FIG. 18 is an explanatory diagram for explaining an example of three-dimensional self-interference.

FIG. 18 is such an example of a three-dimensional penetration for a shape model (a) arranged by two bodies 18a and 18b. Although the mapping models of the respective bodies are produced under normal condition, when the mapping models are assembled, the height of the body 18b containing oblique line portions (18b1 to 18b4) indicated by broken lines is mapped higher than the height of the body 18a. Therefore, as indicated in (b) and (c), a penetrating portion (18c1) and a contact portion (18d1) are produced. To avoid this interference, a total number of lattices of the line segments 18c2 to 18c and 18d2 to 18d5 must be reduced, or a total number of lattices of the line segments 18c6 to 18c9 and 18d6 to 18d9 must be increased.

Figure 19A:
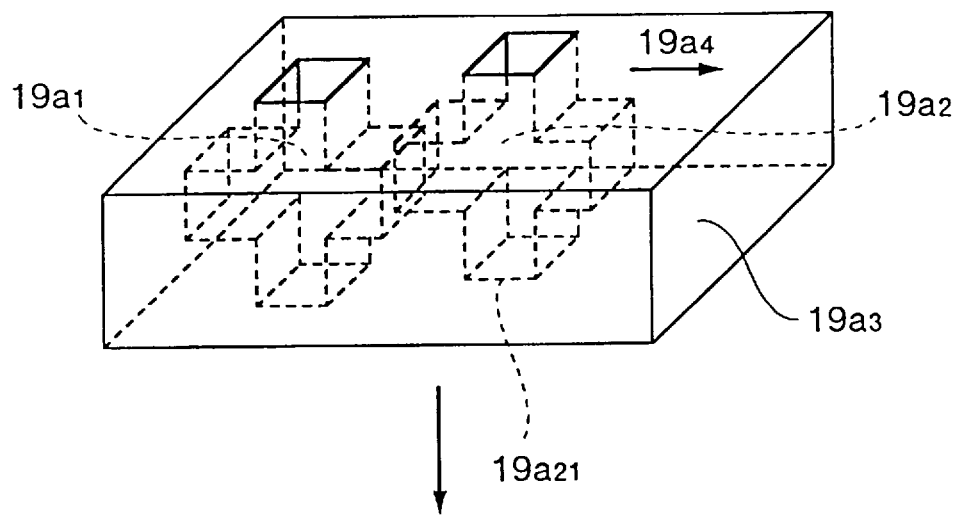
FIG. 19 is an explanatory diagram for explaining an example of interference occurring in bodies for a plurality of holes.
Figure 19B:
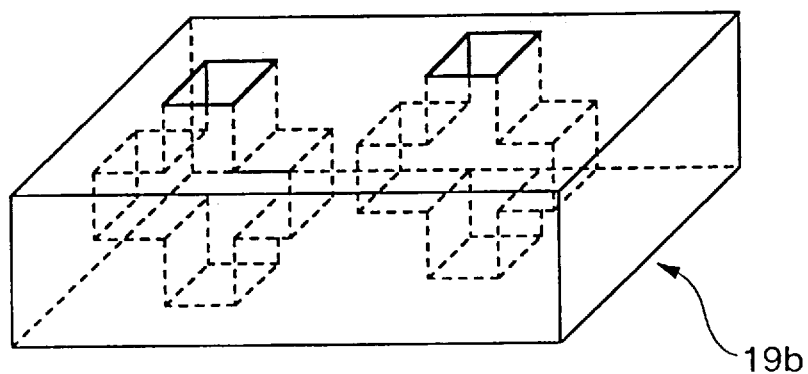

In FIG. 19, there is shown an example of mutual interference among bodies of holes in a shape model having complex shaped holes. The mapping model for each body and positional relationships between the connection surfaces can be determined without any problems. However, since the shapes of the body 19a2 and the body 19a3 are made specific, mutual interference of holes occurs inside the body 19a1 when the mapping models are three-dimensionally assembled as illustrated in (a), so that the overall normal mapping model cannot be produced.

Figure 20A:
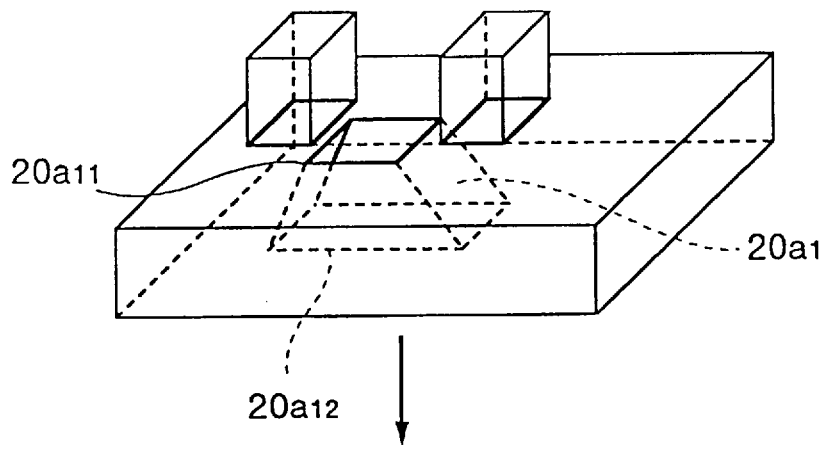
FIG. 20 is an explanatory diagram for explaining an example of interference occurring in bodies for holes and projections.
Figure 20B:
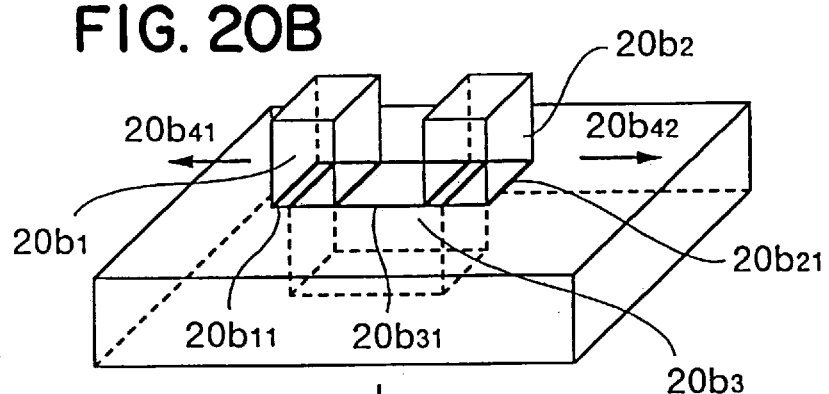
Figure 20C:
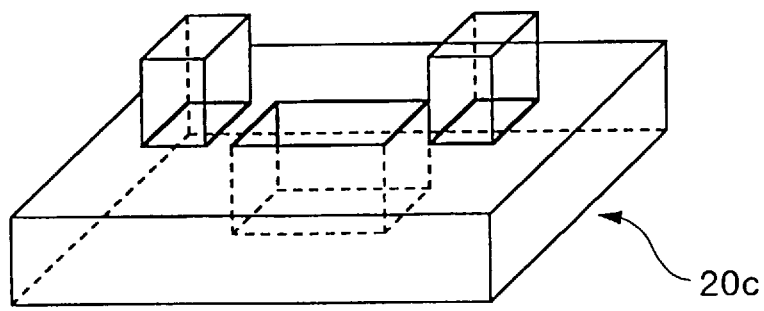

FIG. 20 shows an example where a body of a projection and a body of holes interfere with each other in a shape model (a) having a projection and holes. A mapping model for each of the bodies may be produced without any problem. It is now considered that when a mapping model is assembled, positions of a body 20b1 and a body 20b2 are firstly determined, and finally a body 20b3 is determined. When a determination is made of positions of the respective joint loops on a joint surface, as shown in (b), the body 20b3, and the respective joint loops (20b11, 20b21) of the bodies 20b3 and 20b1 are partially overlapped with a hole loop (20b31), so that mutual interference occurs and thus the overall mapping model cannot be produced under normal condition. This is because the body 20a1 of the shape model is a trapezoid. Although there is no mutual interference in the shape model, the body 20b3 which is the mapping model of the body 20a1 is generated on the basis of not the loop 20a11, but the loop 20a12.

The above-explained mutual interference as represented in FIG. 19 and FIG. 20 may be avoided by transporting the bodies related to the mutual interference. For instance, in the case of FIG. 19, such a mapping model 19b without any interference portion as indicated in (b) can be produced by moving the body 19a2 toward a direction of an arrow 19a4. In the case of FIG. 20, such a mapping model 20c as shown in (c) can be produced by moving the body 20b1 and the body 20b2 towards directions of an arrow 20b41 and an arrow 20b42.

Figure 21A:
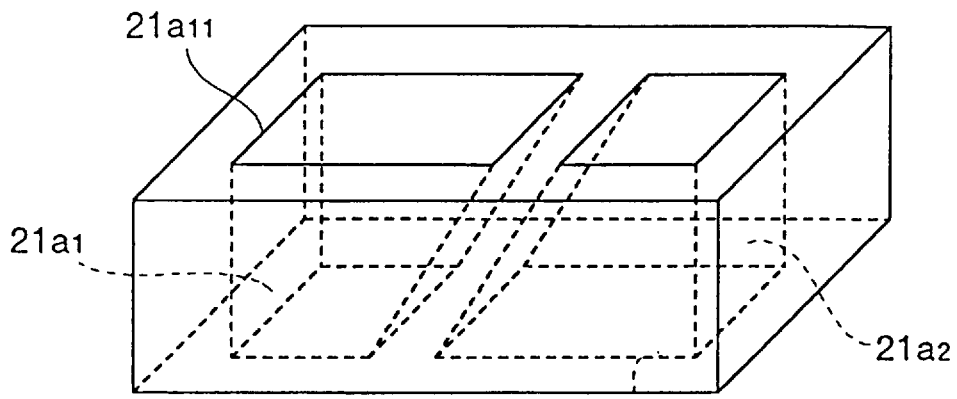
FIG. 21 is an explanatory diagram for explaining an example when an outer shape loop is required to be modified so as to avoid interference occurring in bodies of holes.
Figure 21B:
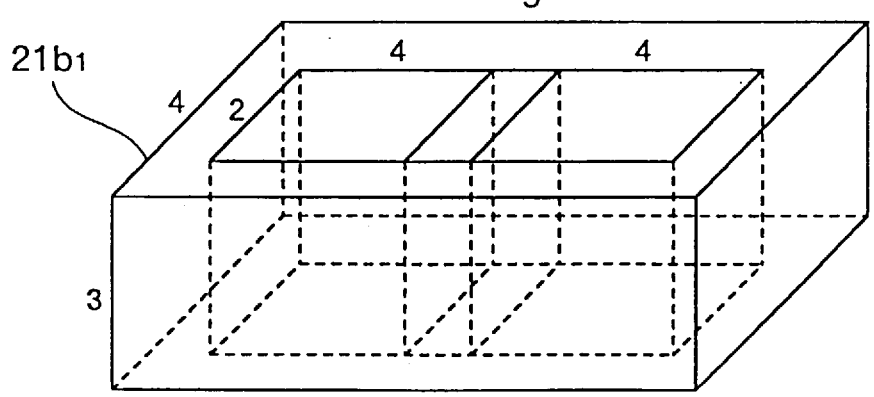
Figure 21C:
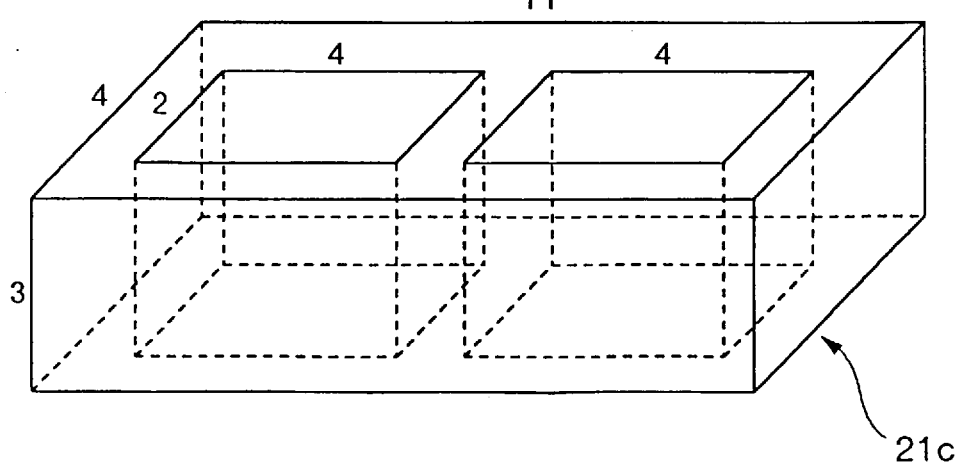

FIG. 21 illustrates an example such that when an outer loop of a connection surface is small, and when mapping models are assembled, bodies of holes mutually interfere with each other. As to a shape model of (a), in the case that for bodies (21a1 and 21a2) of two trapezoidal holes located without any interference, when mapping models are generated on the basis of both of larger loops 21a11 and 21a21, such interference as indicated in (b) occurs. In this case, since there is no lattice number enough to avoid the interference by moving the bodies of the holes on the connection surface, the outer shape loop 21b1 is expanded toward a direction of an arrow 21b2, and then either the body 21a1, or the body 21a2 is transported in a similar manner to that of FIG. 19. So, it is possible to prevent the interference, as represented in (c).

To avoid the occurrence of interference at the assembling stage, a secondary mapping model is altered as explained above. If even portions of the bodies may interference with each other when the mapping models are assembled for the respective bodies, the entire mapping model is displayed on the display screen with having the interference condition (ST17 of FIG. 17). This mapping model is modified or altered to have a normal shape by the system user by employing the mouse operation and the keyboard, so that the mapping model without any interference is produced and complete (ST18 to ST21 of FIG. 17). In this case, similar to the primary alteration, even in the secondary alteration, every time one portion of the mapping model is modified/altered, the entire interference portion is displayed in such a manner that this entire interference portion can be discriminated (ST19). While a confirmation is made as to whether or not any interference portion is present, the modification operation is carried out.

To indicate a concrete operation sequence, FIGS. 22A–26B show display examples of a shape model whose processing has been interrupted because the mapping model could not be generated, and a completed mesh produced by operating such a mapping model by applying this system to this shape model.

Figure 22A:
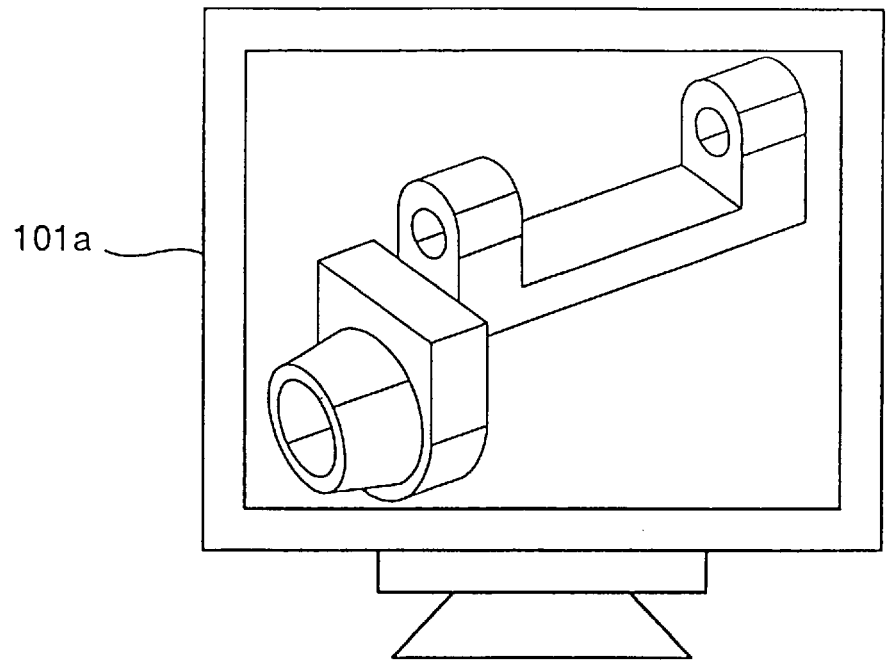
FIGS. 22A and 22B are explanatory diagrams for explaining an example of a failure in generating a mapping model.

FIG. 22A represents such a shape model that when a mapping models are assembled, a contradictory will occur and finite elements cannot be produced.

Figure 22B:
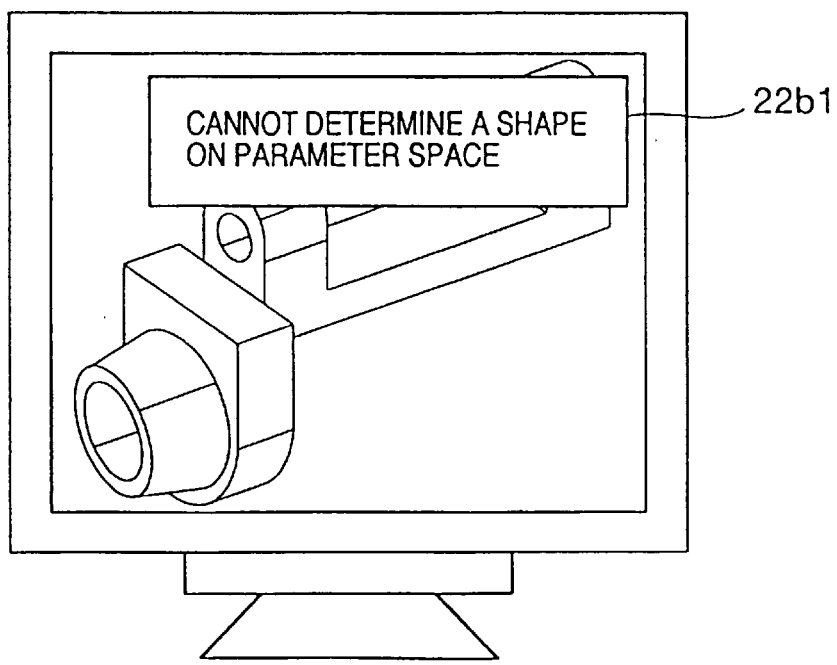

When a finite element model is to be generated with respect to the shape model to be analyzed, which is displayed on the CRT display 101a, a display is changed as shown in FIG. 22B and an error message as indicated by 22b1 is displayed, so that the processing is interrupted. Conventionally, in such a case, the system user must return the display content to FIG. 22A in order to modify the shape model itself.

Figure 23A:
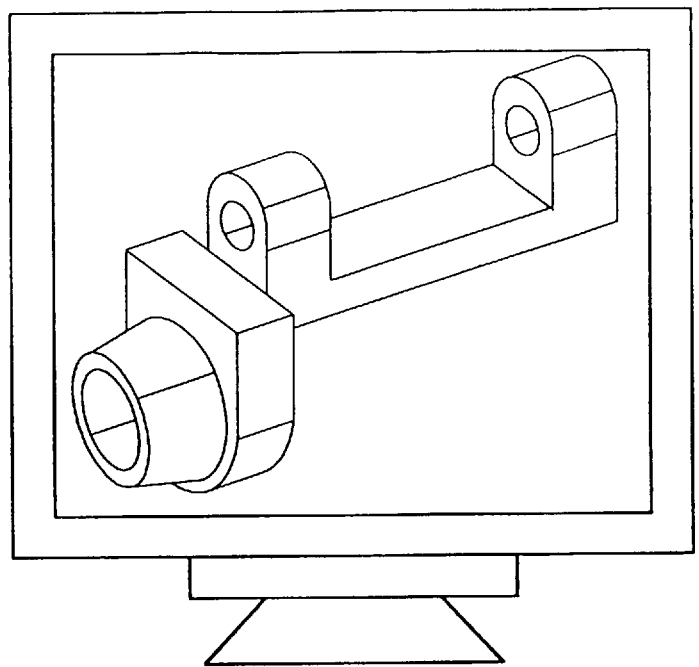
FIGS. 23A and 23B are explanatory diagram for explaining a display condition of an errored mapping model.
Figure 23B:
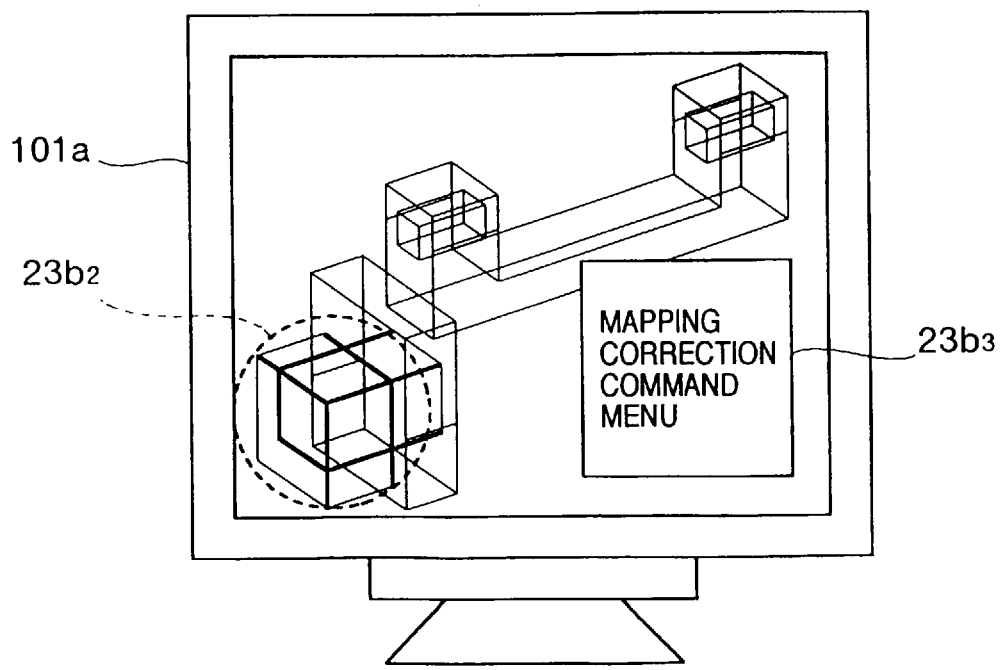

To the contrary, when this system is applied to the shape model (see FIG. 23A) as that of FIG. 22A, both of a mapping image modification command menu (23b3) and a mapping model in which an error portion (23b2) is highlighted are represented on the CRT display 101a, as indicated in FIG. 23B.

Figure 24:
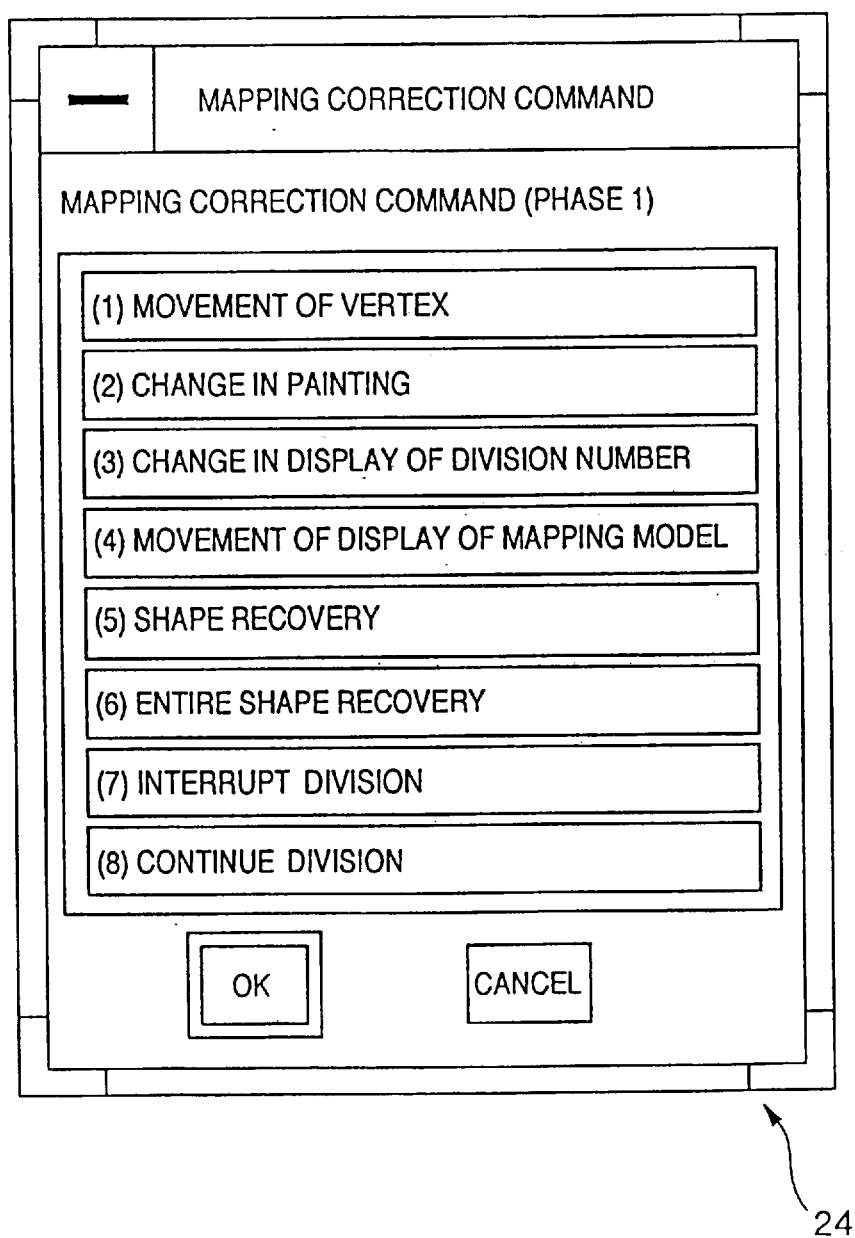
FIG. 24 is an explanatory diagram for explaining an example of a list of a menu for mapping model correction commands.

Here, in FIG. 24, there is indicated a display example of the mapping image correction command menu. In this display example, the following correction command menus are listed up: A vertex movement, a change of filling, a change of displaying a division number, movement of a displayed mapping model, a recovery of a shape, an entire recovery of a shape, an interruption of a division, and a continuation of a division.

Figure 25:
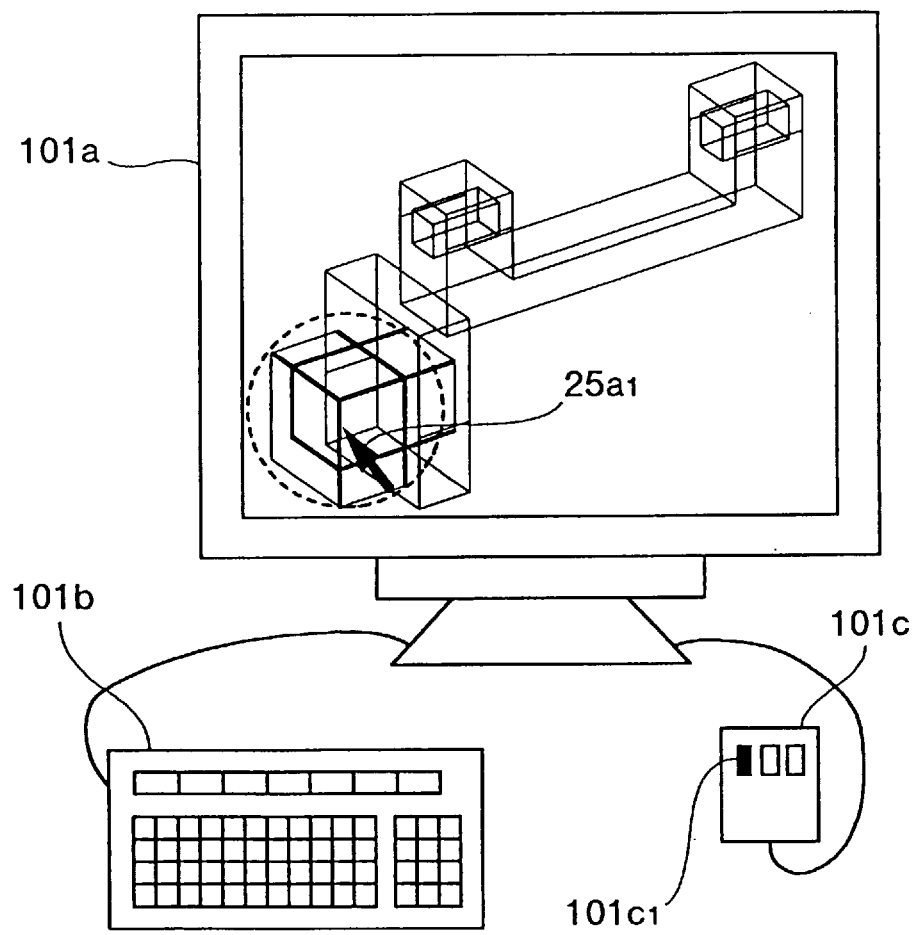
FIG. 25 is an explanatory diagram for explaining a mapping model correction method.

Next, a sequential operation to modify a mapping model will now be explained with reference to FIG. 25. After the system user selects a necessary command from the command menu by using the mouse 101c, an icon 25a1 is moved to a position of an error line segment to be changed on a mapping model indicated on the CRT display 101a by the mouse 101c. Then, the system user instructs a line segment to be altered and the altering direction thereof by depressing the left button 101c1 of the mouse 101. Next, an altering amount is entered via the keyboard 101b by the system user so as to alter the mapping model.

Figure 26A:
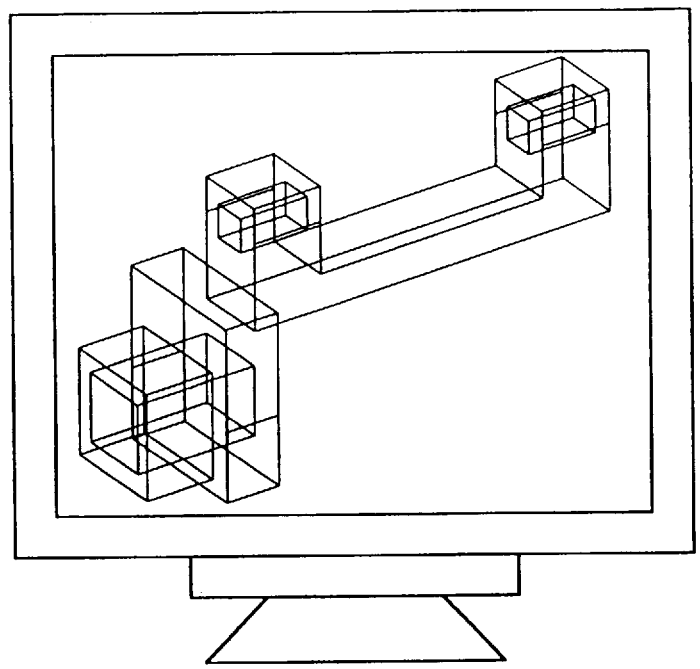
FIGS. 26A and 26B are explanatory diagrams for explaining a finite element model generated based upon a corrected mapping model.
Figure 26B:
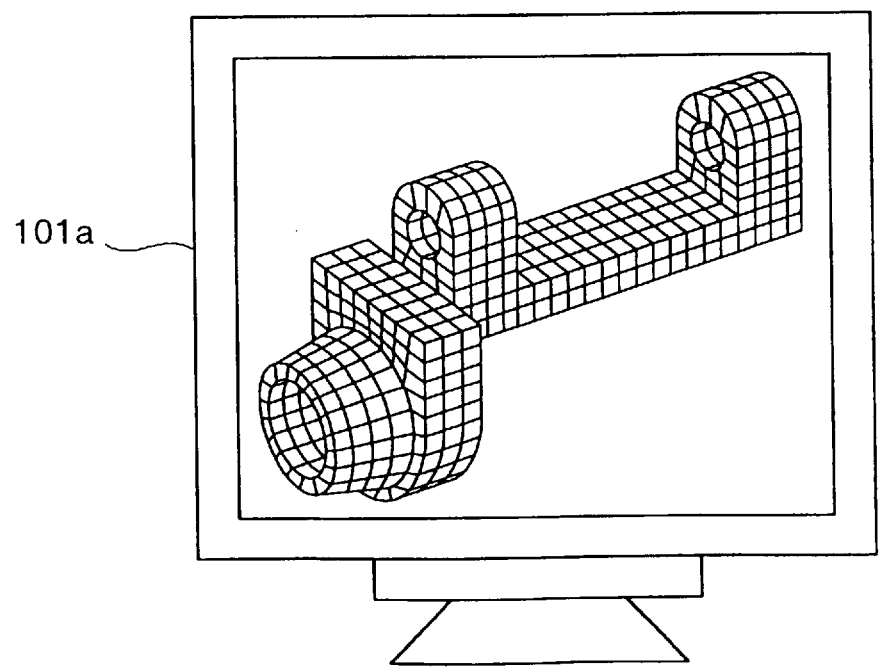

As indicated in FIG. 26A, after the altering operation is repeated until such a mapping model having no error portion is displayed, when the system user instructs to continue the division, a finite element mesh is generated on the shape model of FIG. 23A based on the data about the altered mapping model. As a result, such a finite element model as shown in FIG. 26B is displayed on the CRT display 101a.

Figure 27A:
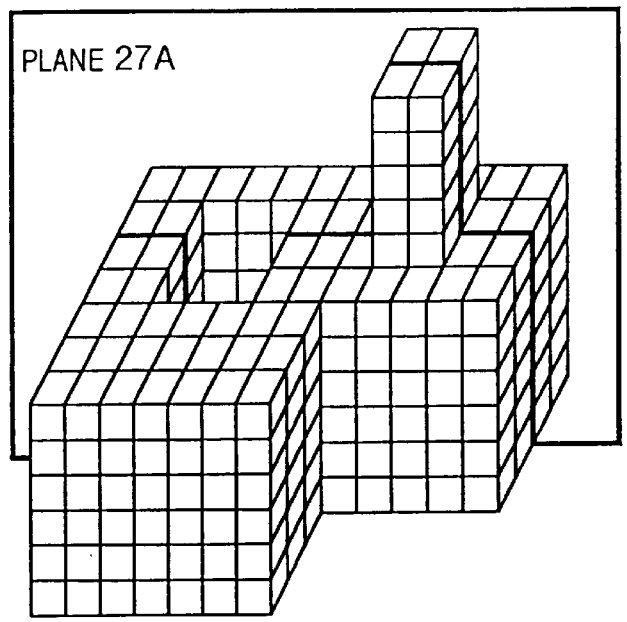
FIGS. 27A and 27B are explanatory diagrams for explaining a example of positional attributes of respective lattice points in a mapping model.
Figure 27B:
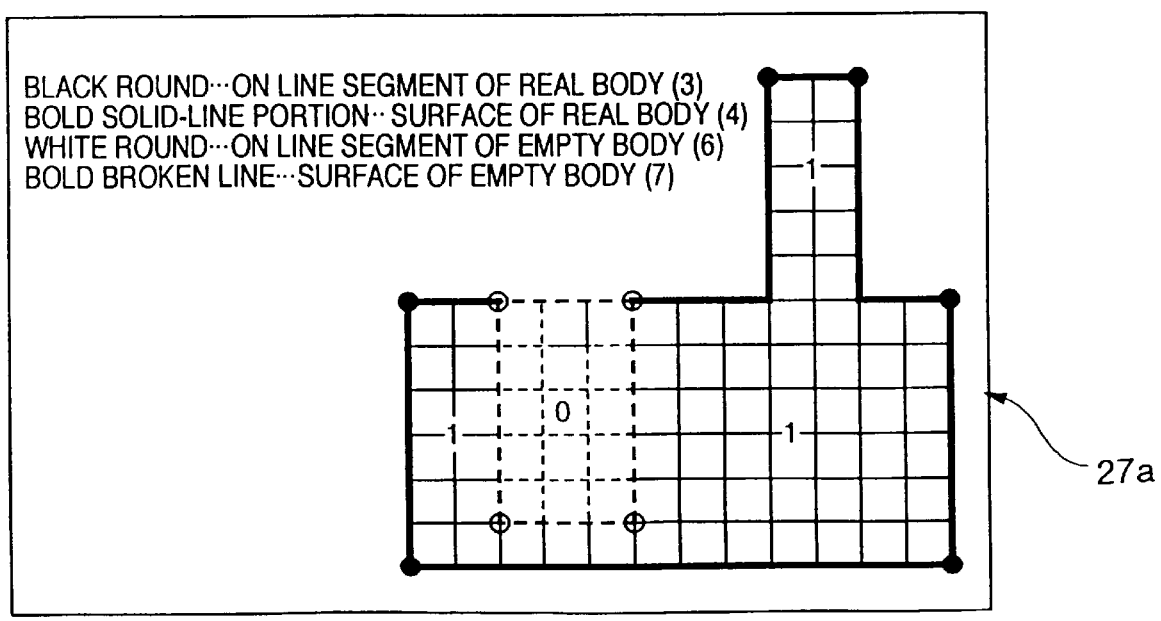

One of methods for judging an occurrence of mutual interference in a body is shown in FIG. 27a and FIG. 27B. Numerical values indicative of positional attributes of lattices, as shown in FIG. 27B, which are obtained from positional relations of the respective bodies in a shape model are set to lattice coordinates generated in a mapping model (FIG. 27A) of each body. Thereafter, a search is made of such a portion which is overlapped, or made in contact with a surface on another body, or a lattice inside of another body, where lattice points on boundaries on the bodies should not be overlapped actually with each other, or made in contact with each other.

As a method for displaying a body to be modified, there is a similar method to that used when the primary mapping model was altered. As a typical alteration method, an example of expanding/compressing a line segment and of moving a point based on the case of the primary mapping model alteration will now be explained.

Figure 28A:
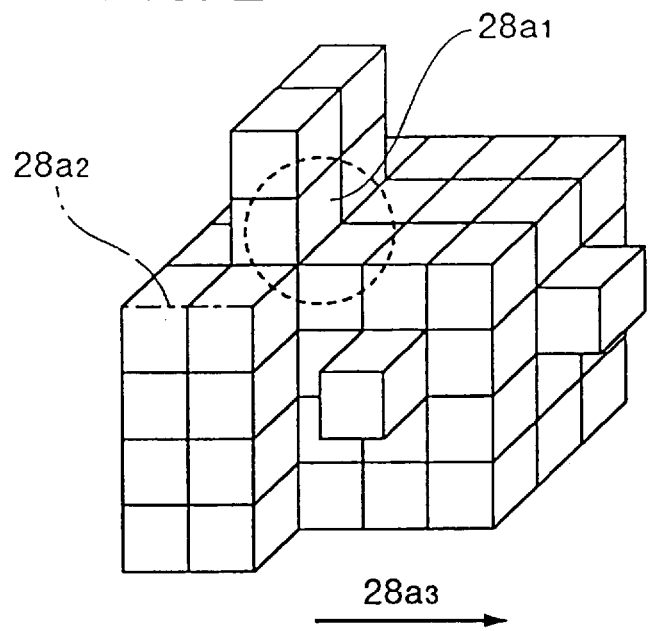
FIG. 28 is explanatory diagrams for explaining an example of a modifying method for an overall mapping model by expanding/compressing a line segment.
Figure 28B:
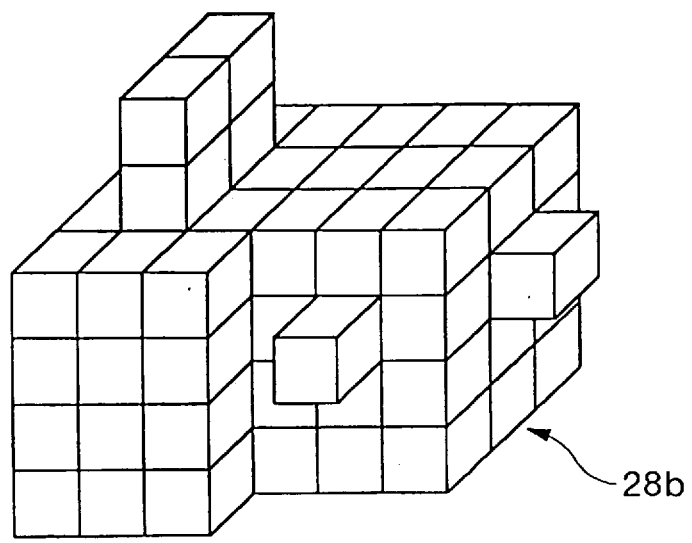

FIG. 28 illustrates an example where interference is avoided by expanding/compressing a line segment. In a mapping model of (a), interference occurs at a portion 28a1. In this case, a line segment 28a2 indicated by a one-dotted line is selected to increase a lattice number toward an arrow direction 28a3 by a positive amount, so that the interference can be avoided. At this time, when all of points located on the side of alteration direction from a middle point of the line segment 28a2 are moved by the same amount, such a mapping model 28b as shown in (b) is reproduced.

Figure 29A:
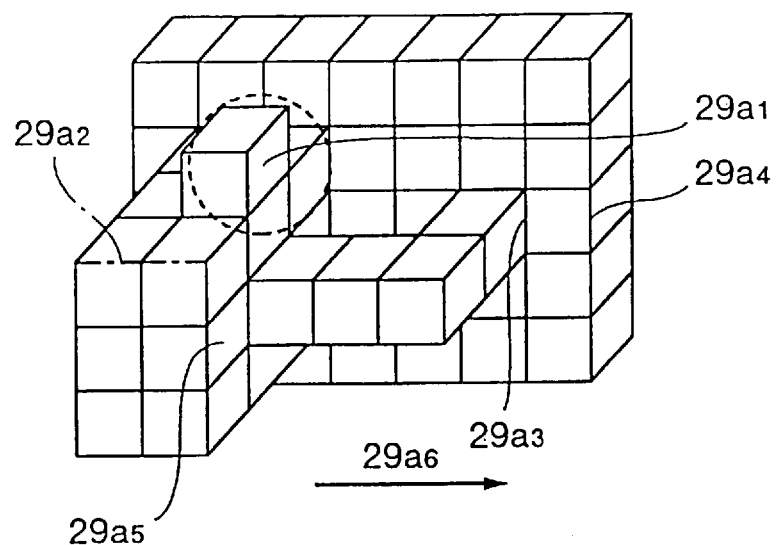
FIGS. 29 is explanatory diagrams for explaining an example of a method for modifying an overall mapping model by way of a point transfer.
Figure 29B:
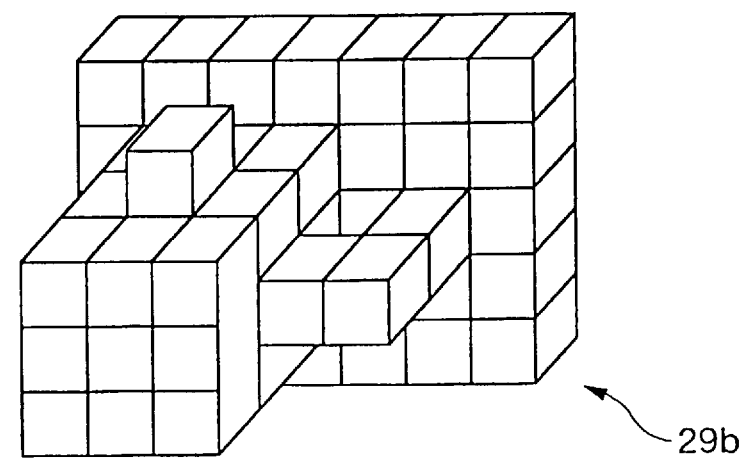

FIG. 29 indicates an example where interference is avoided by moving a point. In a mapping model of (a), when a segment 29a2 is selected so as to be altered toward an arrow direction of 29a6 in a similar manner to the above case in order that interference occurring at the portion 29a1 is avoided, secondary interference would be produced at line segments 29a3 and 29a4. In this case, although the alteration operation is the same as the above case, only the lattice points within the loop 29a5 having a direct relationship with the interference are altered. As a result, such a mapping model 29b as shown in (b) that only necessary portions are altered is reproduced.

As to the movement for each body, a line segment of a body to be altered in an alteration direction is selected, and an alteration amount is inputted from a keyboard to realize the movement of the body. For example, in FIG. 19, as one operation example, when the body 19a2 is moved toward the arrow direction 19a4, the side located in the desired alteration direction from the middle point of the line segment 19a21 is selected and an alteration amount is is entered.

Figure 30A:
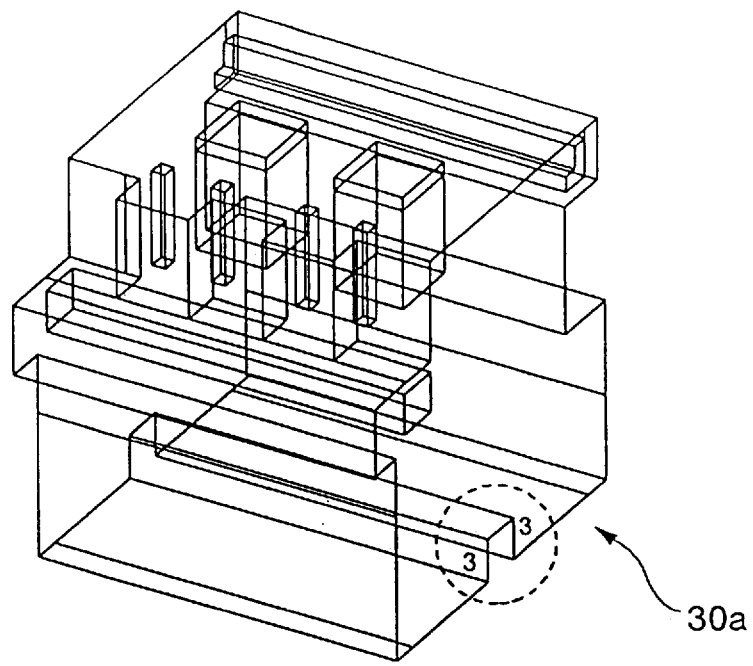
FIG. 30 is an explanatory diagram for explaining an example where a shape of a generated mesh is distorted.
Figure 30A:
Figure 30B:
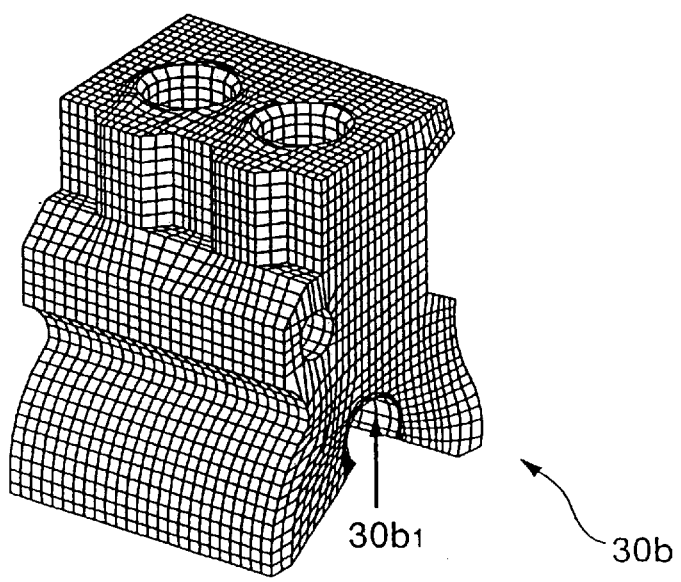
Figure 31A:
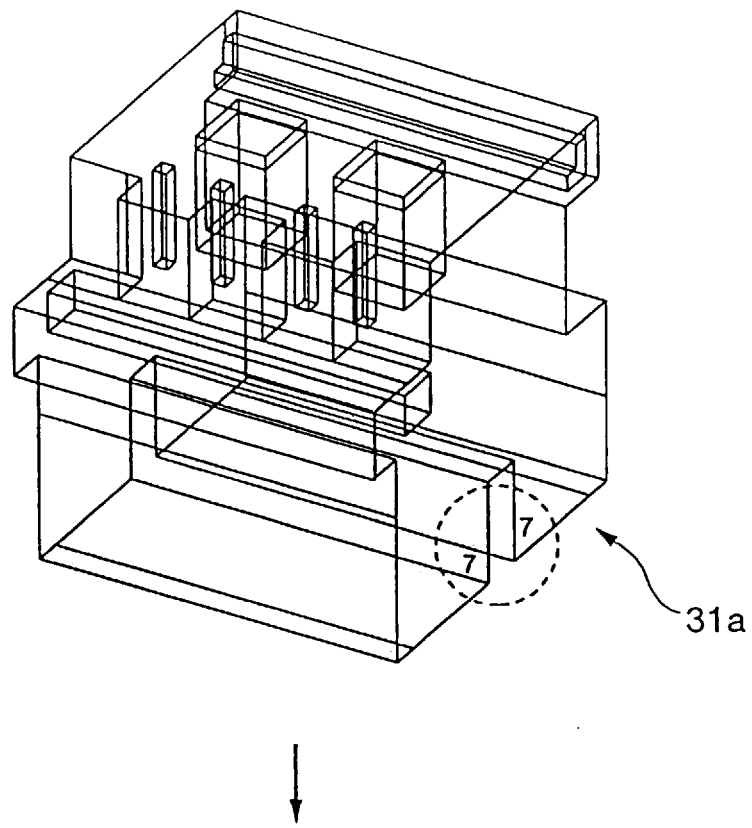
FIG. 31 is an explanatory diagram for explaining an example where the distortion of the generated mesh shape is corrected.
Figure 31A:
Figure 31B:
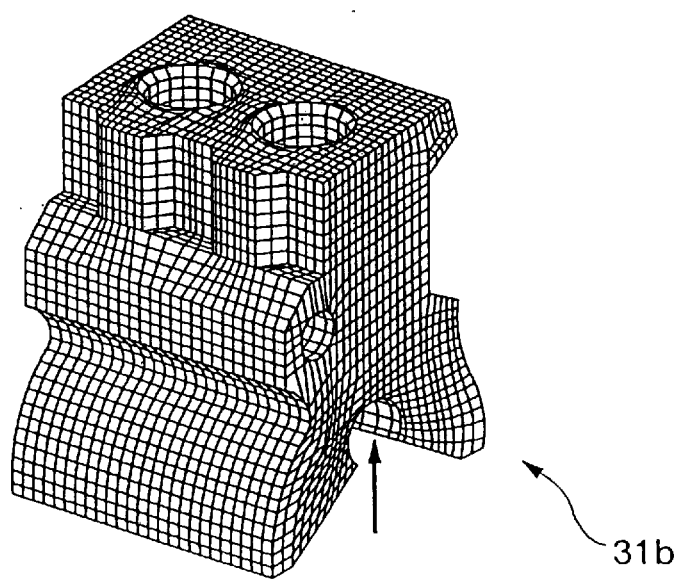

Even when there is no interference within the overall mapping model as a result of the above-described movement modificating operation, the lattice condition can be altered. Accordingly, as illustrated in a portion 30b1 of a finite element model 30b of FIG. 30(b), a detection is immediately made of such a case that a distorted finite element mesh is produced, and then the mapping model is altered from the mapping model 30a of FIG. 30(a) to the mapping model 31a of FIG. 31(a), so that a mesh shape may be adjusted as a finite element model 31b of FIG. 31(b), and the coarse/fine characteristics of the mesh may be partially controlled.

Figure 32:
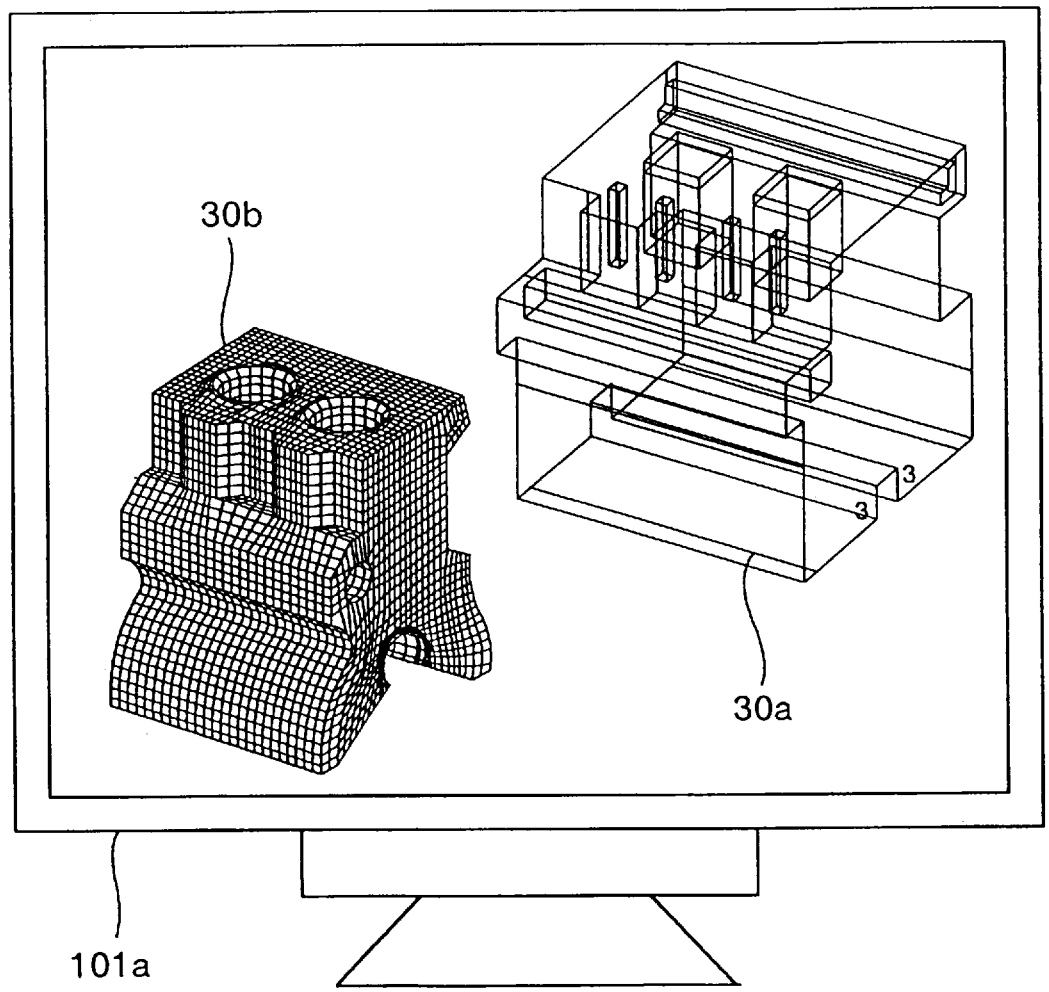
FIG. 32 is an explanatory diagram for explaining an example where a mapping model before modification and a finite element model are displayed on the same display screen.
Figure 33:
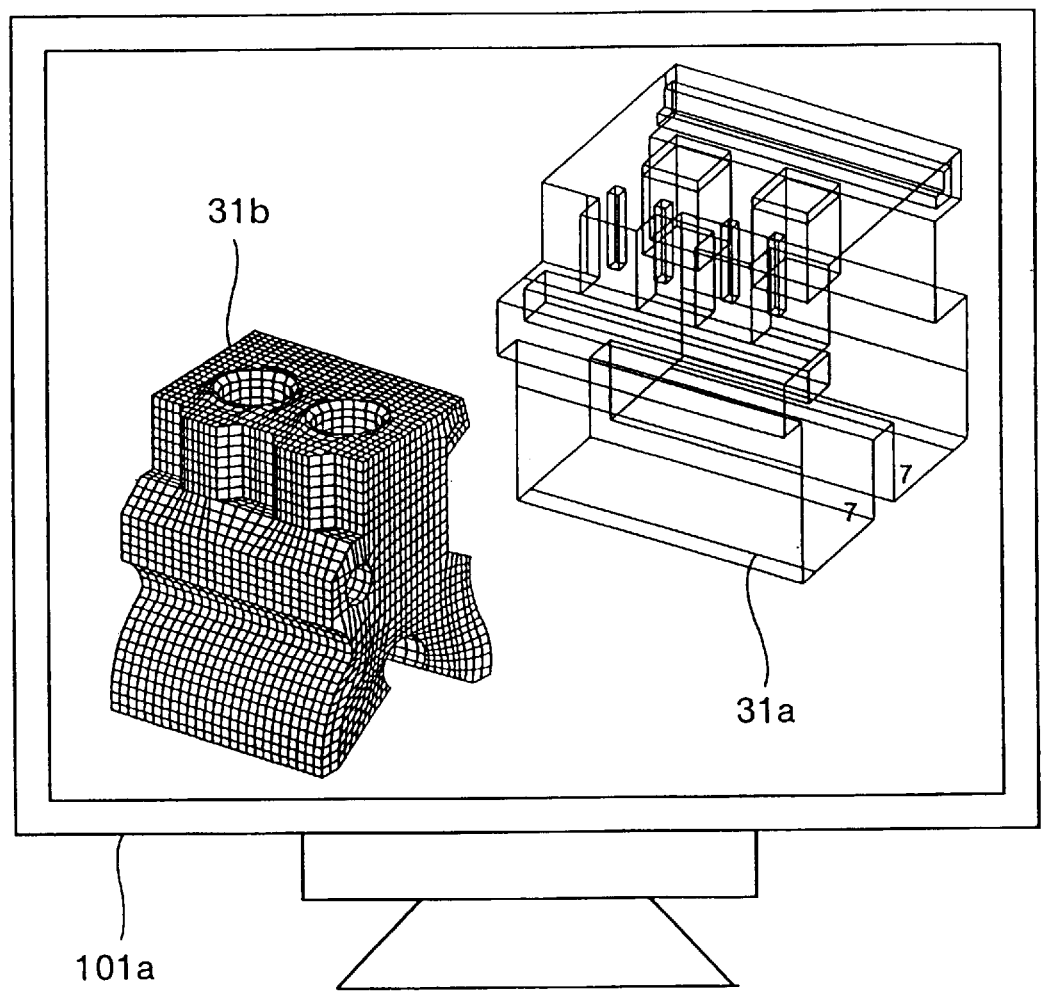
FIG. 33 is an explanatory diagram for explaining an example where a mapping model after modification and a finite element model are displayed on the same display screen.

At this time, in order that the system user can control the coarse/fine characteristics with his satisfaction while contrasting the portions how to finite element mesh is changed in accordance with the modification of the mapping model, both of a mapping model (30a, 31a) and a finite element model (30b, 31b), as illustrated in FIG. 32 and FIG. 33, are displayed on a single display screen at the same time. Also, when the mapping model 30a indicated on the screen is modified in FIG. 32, the present display content is quickly changed into a modified display content as indicated by 31a of FIG. 33, and the corresponding finite element model 31b is displayed at the same time.

It should be noted that the respective operations related to the modification of mapping model as described above may be achieved by selecting a menu as indicated in FIG. 24, or entering commands. In any of these cases, it is desirable that the data before being altered are temporarily saved, so that the recovery operation can be simply performed from a halfway of the alteration operation, to return to either the initial condition, or the condition just before the alteration. After a series of the above-explained interactive operations have been ended, based on the corresponding relationship between the boundary lattice of the resultant mapping model and the boundary lattice of the shape model, a lattice is produced within the shape model, so that a final finite element mesh is generated (ST22 of FIG. 17).

Another embodiment of the present invention will now be described.

Figure 34:
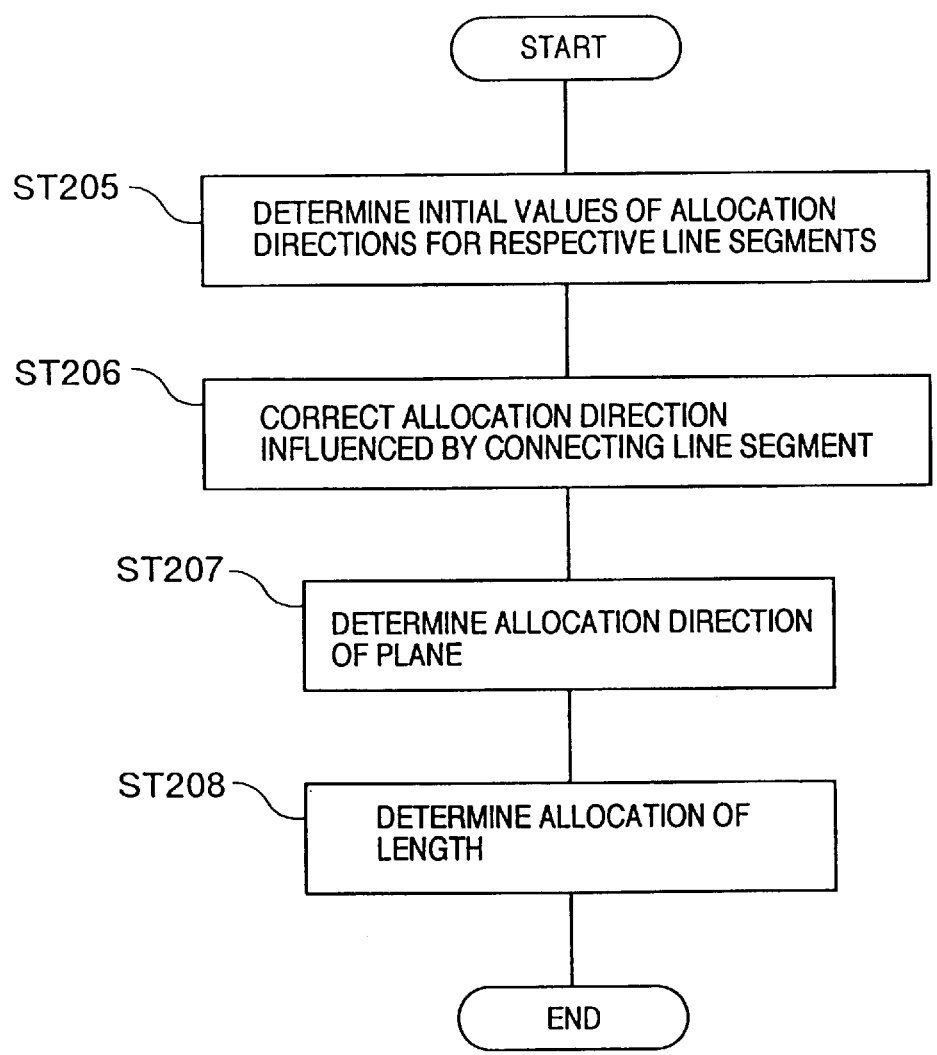
FIG. 34 is a flow chart for explaining steps for automatically generating a recognition model.

FIG. 34 is a flow chart for explaining generation of a recognition model. In the above-described (2), a recognition model is generated by allocating any one of three coordinate axes ($\xi$, $\eta$, $\zeta$,) for constituting a mapping image space and a length of a line segment on the recognition model to the respective line segments constituting a shape model. When a direction of a line segment is allocated, a decision is made as to which of the $\xi$, $\eta$, $\zeta$ axes is allocated to the respective line segments as initial values (ST205). Next, considering influences of line segments connected, the allocation direction of each line segment is modified (ST206). Based on the result, as to the respective surfaces for constituting the shape model, the correspondence relationship is made to any one of the three planes ($\xi$-$\eta$ plane, $\eta$-$\zeta$ plane, $\zeta$-$\xi$ plane) within the recognition model (ST207). With the above-described sequence, after the allocation directions of all of the line segments have been made, the allocations of lengths to the respective line segments in the recognition model are determined based upon the ratio of the line segment lengths of the shape mode (ST208).

Figure 35A:
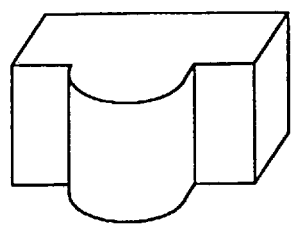
FIG. 35 is an illustration for showing an example of approximation of a curved surface by plural planes for generating a recognition model.
Figure 35B:
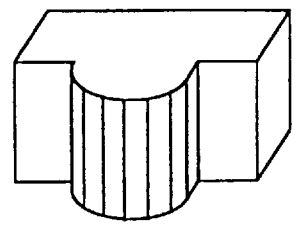
Figure 35C:
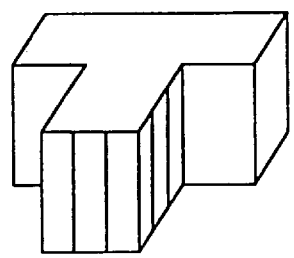

FIG. 35 illustrates how to produce a recognition model in the case that a curved surface is contained in a shape model. In the case of such a shape model in FIG. 35(a), the curved surface is approximated by using a plurality of planes as indicated in FIG. 35(b). With respect to the respective line segments produced as a result, a direction and a length are allocated as indicated in FIG. 35(c).

Subsequently, a sequence (ST205 to ST206) for automatically allocating directions to line segments will now be explained more in detail.

Figure 36A:
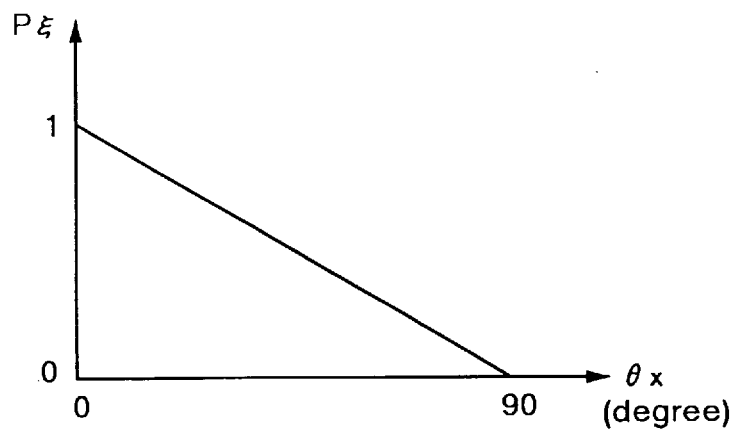
FIGS. 36A and 36B are graphic representations for indicating a membership function used to determine allocation directions of an edge line and a plane.

At a step ST5, application degrees to the respective axes, which indicate such possibility that the respective line segments are allocated to the $\xi$, $\eta$, $\zeta$, axes are set by employing a membership function in the fuzzy theory. An initial value of the application degrees may be obtained from such a membership function that angles defined by the line segments with respect to the x, y, z axes which are the three coordinate axes are used as independent variables. The membership function of FIG. 36A represents the application degree to the $\xi$ axial direction, and the same membership function is defined as to the $\eta$ and $\zeta$ axial directions. In FIG. 36A, symbol "$\theta x$" indicates an angle defined between the line segment to be processed and the x axis, and symbol "$P_\xi$" shows the application degree to the $\xi$ axial direction. Similarly, initial values of the application degrees to the $\eta$ and $\xi$ axial directions are obtained based on angles of the respective line segments with respect to the y and z axial directions.

Figure 36B:
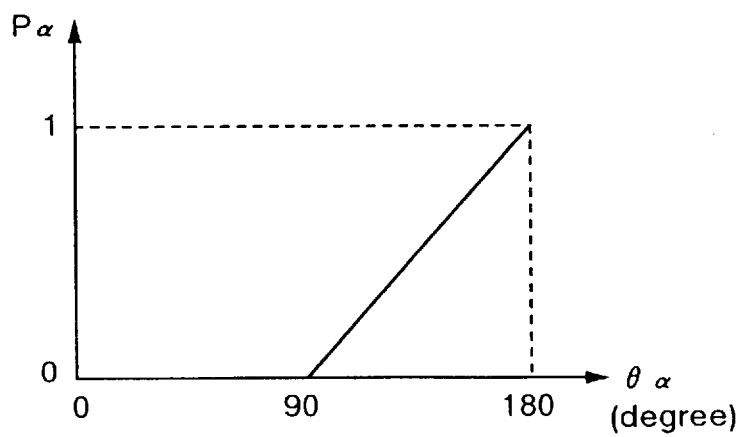
Figure 37:
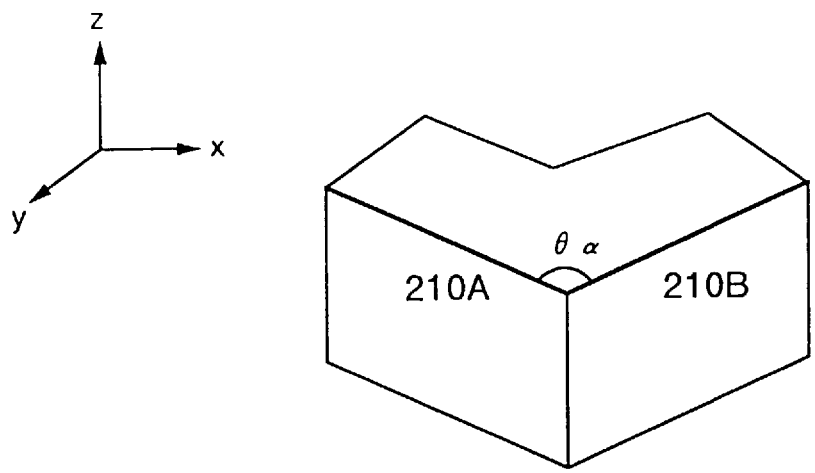
FIG. 37 is an illustration for explaining an angle defined by two adjoining line segments.

Next, at a step ST206, the application degrees of the respective line segments are modified, depending upon the influences of the line segments connected thereto. FIG. 36A and FIG. 36B represent membership functions used to determine allocation directions of edge lines and planes. First, as shown in FIG. 36B, a definition is made of such a membership function indicative of possibility that two adjacent line segments are allocated in the same direction. Symbol "$\theta\alpha$" shows a magnitude of an inner angle between the two line segments, and symbol "$P\alpha$" represents possibility that the two line segments are allocated along the same direction. As shown in FIG. 37, when two line segments 210A and 210B are set on the space, alteration of the application degree of the line segment 210B influenced by the line segment 210A is executed by selecting an optimum value by taking account of the initial application degrees of the line segments 210A and 210B along the respective axial directions, and the magnitude of the mutual influences by the line segments 210A and 210B by $\theta_\alpha$.

It should be noted that the direction allocating method is further described more in detail in JP-A-2-236677.

In accordance with the above-explained decision method, such a model mostly approximated to the original shape of the shape model in view of the topologically and geometrically equal relationships and featured by constructed of only the line segments parallel to the orthogonal coordinate axes can be automatically produced from the shape model. However, the final arrangement and the final shape of the elements generated along the automatic decision allocating directions do not always satisfy the intention of the system user. Examples and problems thereof with employment of this determining method are shown in FIG. 38 to FIG. 42.

Figure 38:
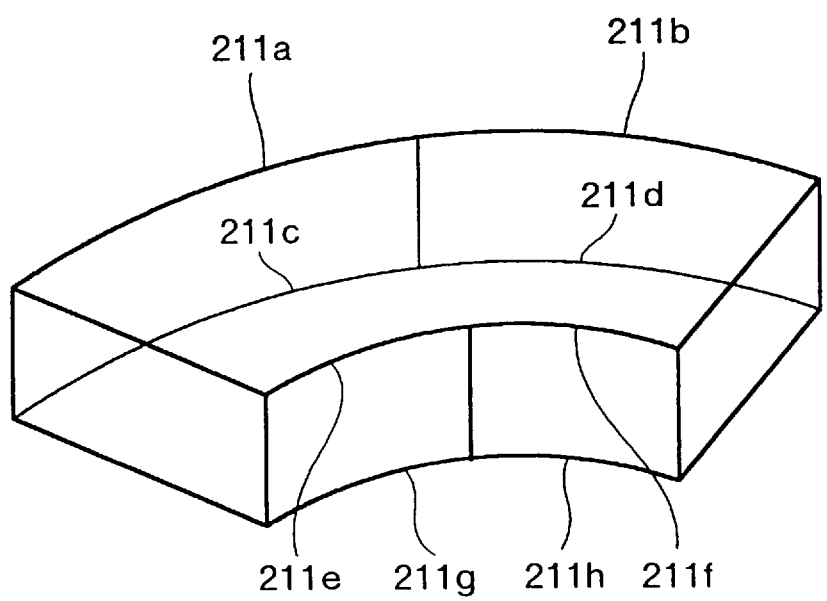
FIG. 38 is an illustration of a shape model for explaining constraint about a line segment allocation direction.
Figure 39:
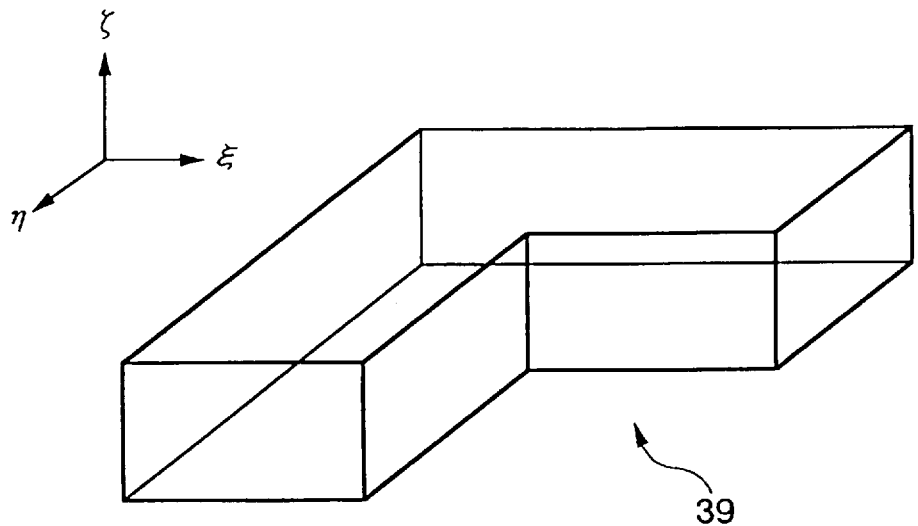
FIG. 39 is an illustration of a recognition model automatically produced from the shape model of FIG. 38.
Figure 40:
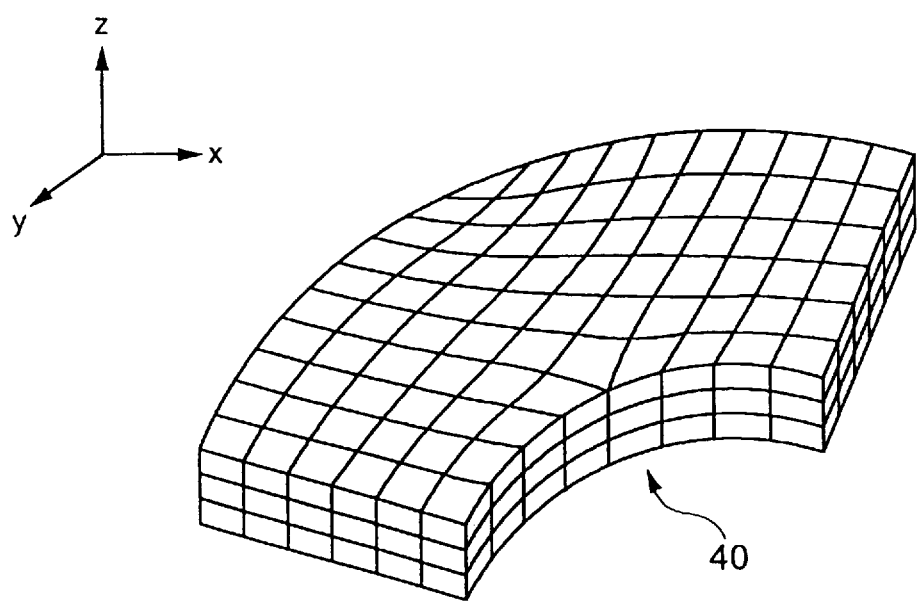
FIG. 40 is an illustration of a finite element model automatically produced based on the recognition model of FIG. 39.

FIG. 38 represents a shape model used in this example. In the case that the allocation directions of the respective line segments of the shape model shown in this figure are automatically determined in accordance with the above-described method, it is assumed that a recognition model shown in FIG. 39 is produced. In this case, an orthogonal lattice is generated on this recognition model to produce a mapping model, and thereafter this mapping model is mapped on the shape model, so that a resultant finite element model is given as shown in FIG. 40.

Figure 41:
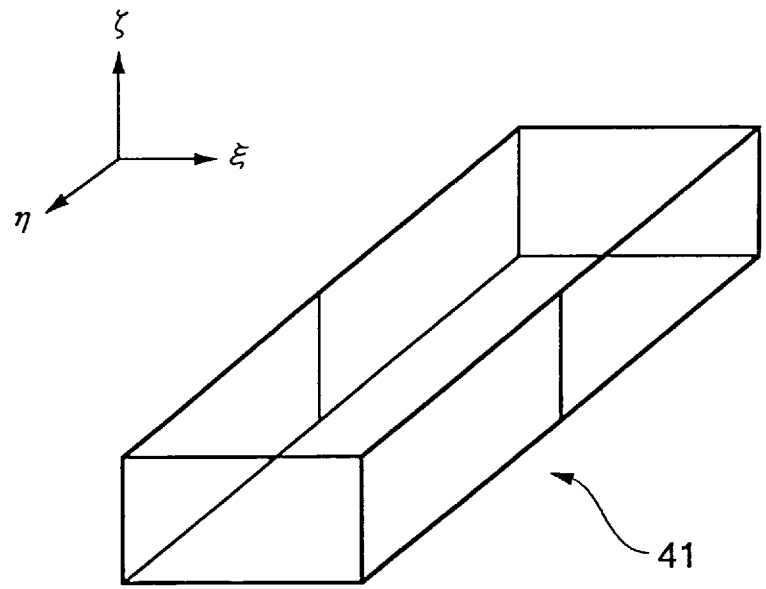
FIG. 41 is an illustration of a recognition model which will be produced from the shape model of FIG. 38, whose line segment allocation direction is different from that of FIG. 39.
Figure 42:
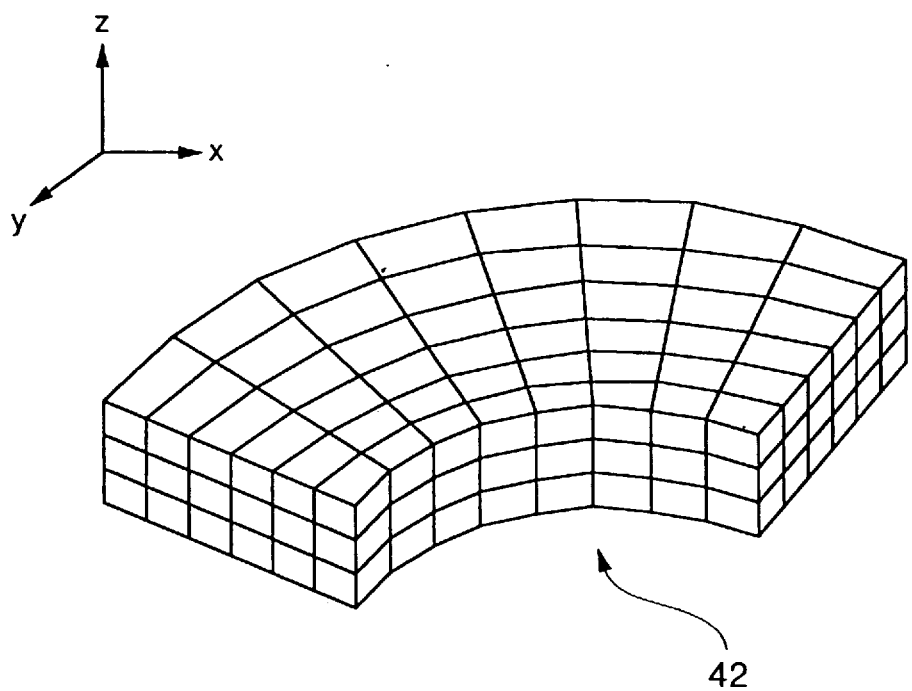
FIG. 42 is an illustration of a finite element model automatically generated based on the recognition model of FIG. 41.
Figure 43:
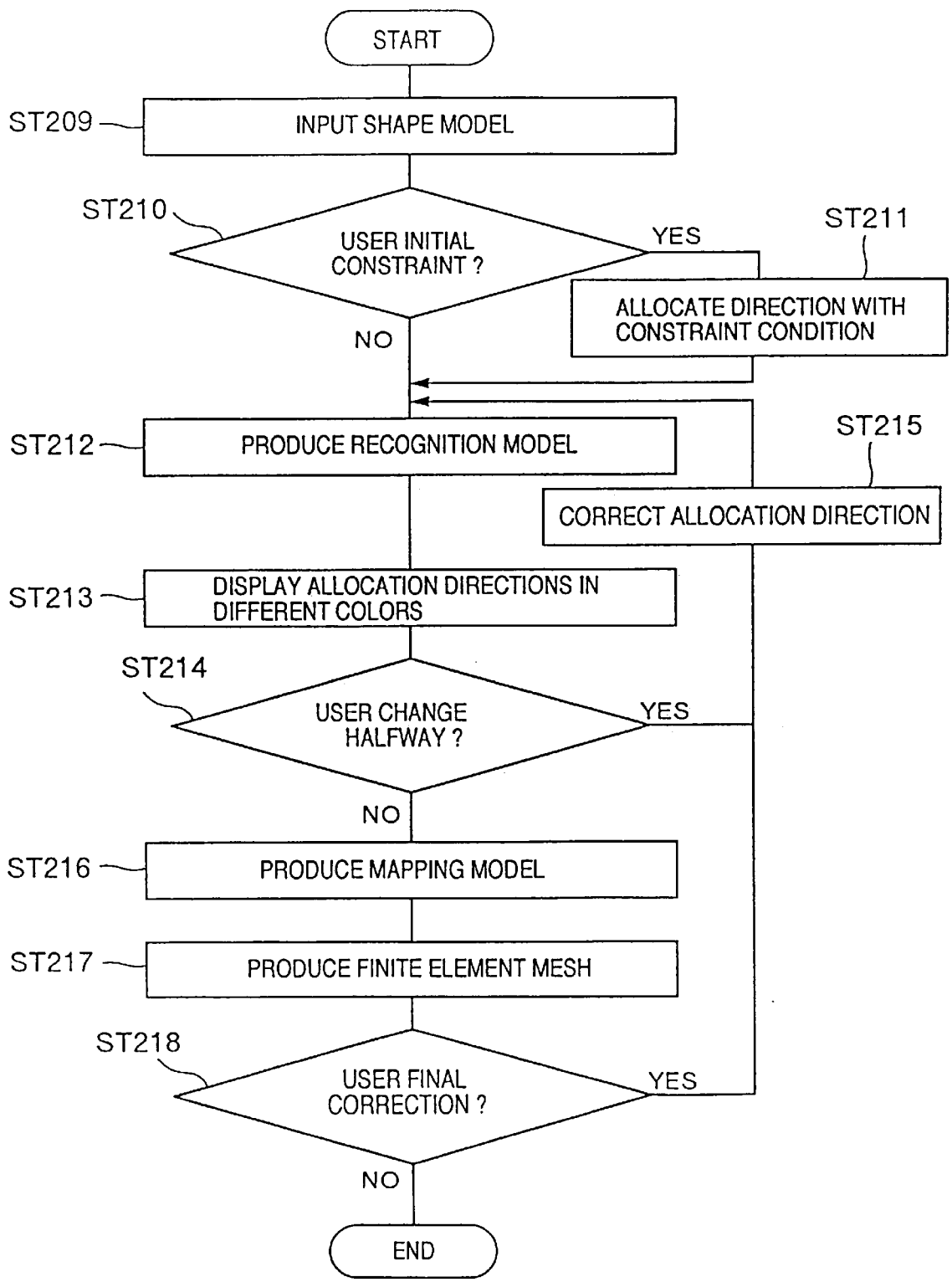
FIG. 43 is a flow chart for explaining a user intervening type method for controlling a finite element mesh.
Figure 44A:
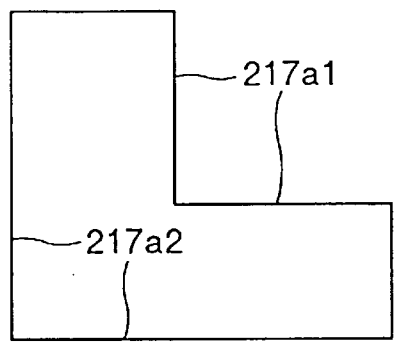
FIG. 44 is an explanatory diagram for explaining a difference between constraint on the line segment direction allocation and a designation thereto.
Figure 44B:
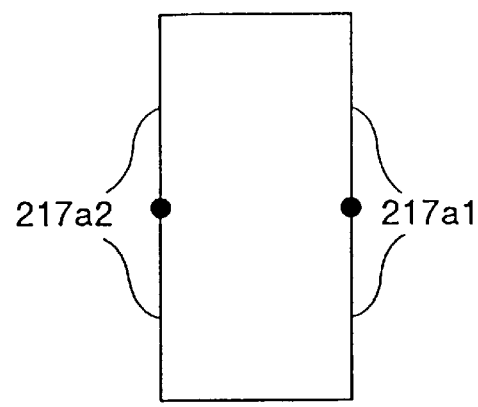
Figure 44C:
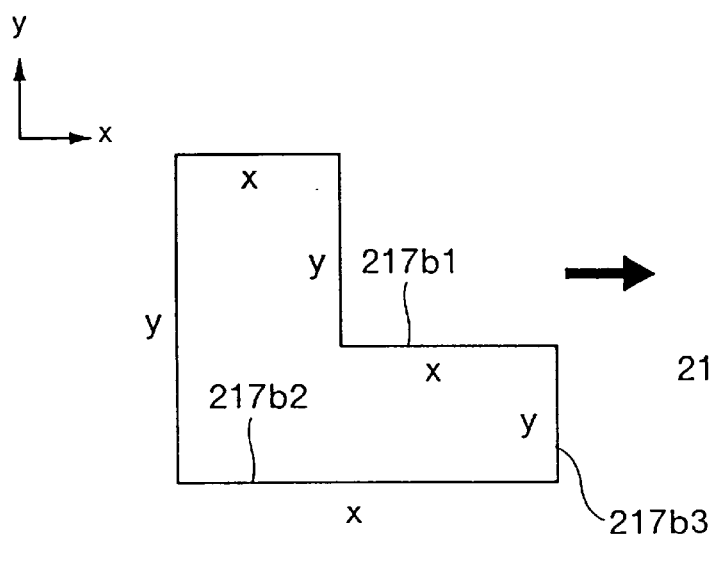
Figure 44D:
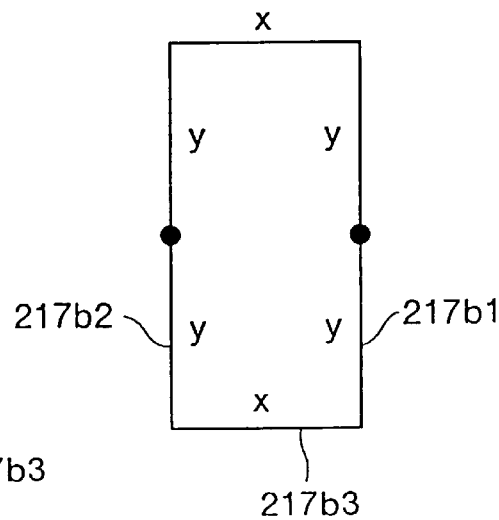

To the contrary, when an arrangement of an element desired by the system user is illustrated by numeral 42 of FIG. 42, there is a problem that this request could not be satisfied by only employing the automatic determining method. In other words, this is because the recognition model 41 shown in FIG. 41 cannot be automatically produced. In this embodiment, to solve this problem, the system of FIG. 2 is improved as shown in FIG. 43 (note that modification of a mapping model is omitted). An overall flow operation of this embodiment will now be explained in accordance with the entire flow chart of FIG. 43.

New Item 1). A shape model to be analyzed by the finite element method is set (ST209).

New Item 2). If required, the automatic processing of the system is initiated by the system user, and the allocation directions of the respective line segments of the shape model are constrained in the interactive mode. The constraint data is saved and is used when the recognition model is produced (ST210).

New Item 3). A recognition model is generated from the shape model, which is featured by being arranged only by the line segments parallel to the orthogonal coordinate axis. At this time, if there is the constraint condition of New Item 2), then the recognition model is generated based on this constraint data. Otherwise, the recognition model is automatically produced in accordance with the basic system (ST211 to 212).

New Item 4). The allocation directions of the respective line segments of the recognition model generated in New Item 3) are displayed in correspondence with the respective edge lines of the shape model on the display screen (ST213).

It should be understood that as the basic condition, the recognition model is topologically equal to the shape model, and is not contradictory with this shape model. When the recognition model is generated in New Item 3), in such a case that the recognition model cannot be produced because there is such a line segment allocated to the direction which can not maintain the topological equivalent characteristic with this shape model, this line segment is displayed in highlight mode, and simultaneously a message for announcing the sort of error is displayed on the same screen (ST214).

New Item 5). When the line segment is displayed in highlight mode at New Item 4), based upon the information about the allocation direction of the line segment, and also the error message displayed in New Item 4), the system user initiates the automatic processing of the system, and designates the allocation directions of the respective line segments of the shape model in an interactive manner, and modifies in such a manner that a recognition model can be produced (ST215).

The processing defined in New Item 3) to Item 5) are repeated until there is no line segment displayed in highlight mode and no demand to modify an the allocation direction by the system user.

New Item 6). Based on the division information entered by the system user, the recognition model generated in accordance with the sequential operations of New Item 2) to New Item 5) is fine-adjusted in such a manner that this recognition model is constructed only by the line segments whose lengths are integer-multiple of length of the unit element. Thereafter, the orthogonal lattice is produced in the recognition model to form a mapping model (ST216).

New Item 7). Based upon the corresponding relationship between the lattice of the boundary of the mapping model obtained in New Item 6) and the lattice of the boundary of the shape model, a lattice is generated within the shape model so that a finite element mesh model is produced (ST217).

When the system user confirms the finite element mesh model displayed on the screen in New Item 7) and wants to further change the shape of the recognition model by altering the allocation direction of the line segment, the allocation direction of the line segment may be altered with reference to the allocation information displayed at New Item 4) in a similar manner to New Item 5). The processing of New Item 4) to New Item 6) are repeated until no request is made from the system user (ST218).

FIG. 44 is a diagram for illustrating a constraint example of the line segment allocation direction in New Item 2), and a designation example of the line segment allocation direction in New Item 5). In this case, constraint in the line segment allocation direction implies that as shown in line segments 217a1 and 217a2 of FIG. 44, line segments to be allocated along the same direction are designated, whereby the system user designates which line segments should constitute a pair. On the other hand, a designation in the line segment allocation direction implies that based on the allocation direction information about the respective line segments indicated by New Item 4), such a designation is established as to which direction of the coordinate axes the selected line segment is concretely allocated to. When the recognition model of the shape model shown in FIG. 44(a) is wished to be changed into such a model as indicated in FIG. 44(b) by the direction constraint, both of the line segments 217a1 and 217a2 are selected and one of the values indicative of the direction is entered. Similarly, when the recognition model of the shape model indicated in FIG. 44(c) is wished to be changed into such a model as shown in FIG. 44(d) by the direction designation, the line segments 217b1 and 217b2 are selected and a value representive of the X direction is entered. Then, the line segment 217b3 is selected and a value indicative of the Y direction is inputted, so that a recognition model of FIG. 44(d) can be produced.

As one means for realizing the present embodiment, a description will now be made of an operation sequence realized in a workstation constructed of a CRT display, a mouse, and a keyboard.

Operation 1). A shape model formed by a system user is represented on a screen 218a of the CRT display (corresponding to New Item 1)).

Figure 45:
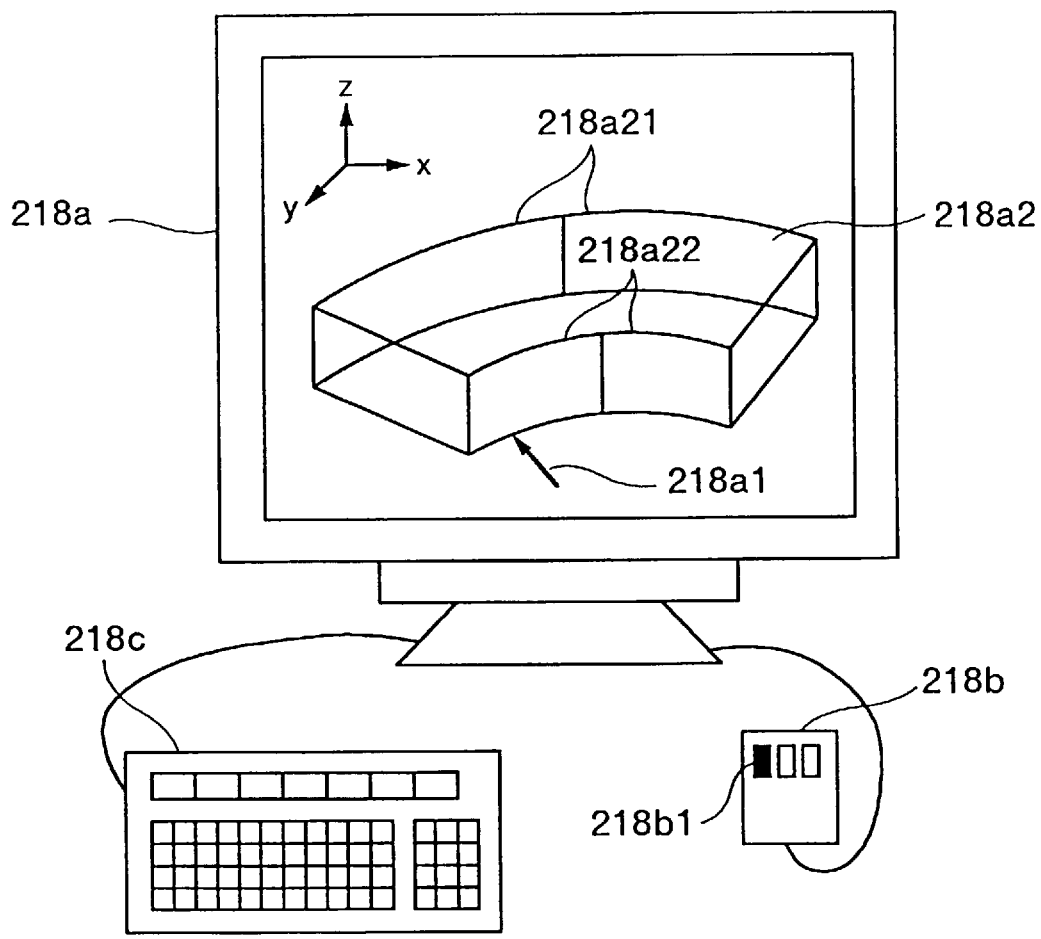
FIG. 45 is an explanatory diagram for explaining a method for realizing a modification of the line segment direction allocation.

Operation 2). Such a line segment desired to constrain the allocation direction in the shape model is selected by using a mouse 218b to move an icon 218a1 and by depressing a button 218b1 of this mouse 218b (will be referred to as "to pick" hereinafter), and the allocation direction of the selected line segment is constrained. In the case of FIG. 45, the line segments 218a21 and 218a22 to be allocated along the same direction of the shape model 218a2 identical to the shape displayed on the screen of FIG. 38 are picked, and then any one of the x, y and z axial directions is entered from the keyboard 218c. It should be understood that x, y, z axes indicate axes in a mapping space. At this time, the method for designating the axial direction may be achieved by entering either x, y, z, or 1, 2, 3. More than one line segment may be selected (corresponding to New Item 2).

Operation 3). Based on either the condition defined in Operation 2), or the line segment allocation direction automatically determined by the system, a recognition model is generated. During the producing stage, the line segment along the x axial direction is indicated in red color, the line segment along the y axial direction is indicated in blue color, and the line segment along the z axial direction is indicated in yellow color in such a manner that the allocation directions of the determined line segments are over-lapped with the line segments for constituting the above-explained shape model 218a2. At this time, even the allocation directions of the respective line segments may be represented by such characters of x, y, z, or 1, 2, 3 near the respective line segments, or even the sorts of the lines may be varied.

When a line segment 218a21 is allocated along the x axial direction, and a line segment 218a22 is allocated along the y axial direction in the shape model of 218a2, the line segment 218a21 is again displayed in red color and the line segment 218a22 is again displayed in blue color.

Figure 46A:
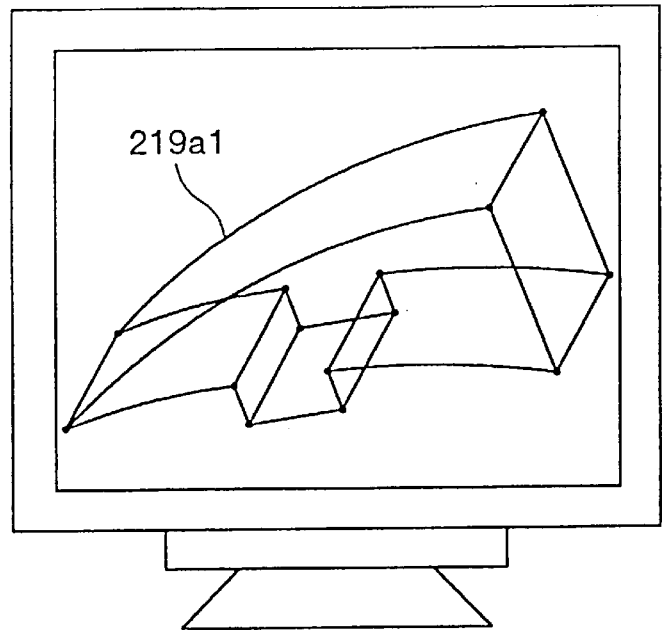
FIGS. 46A and 46B represent such a condition that a system failed to allocate a line segment direction, whereby a recognition model could not be generated.
Figure 46B:
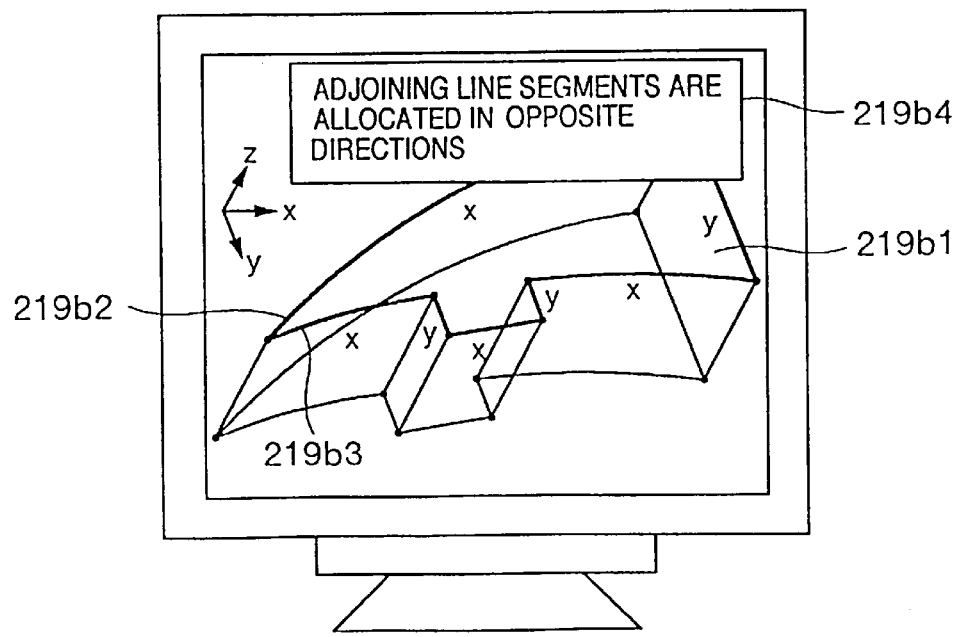

Furthermore, when there is such a line segment causing that the recognition model can not be generated, a width of this line segment is displayed to be wider than the widths of other line segments, by which the system user may readily modify the allocation direction of the line segment. This example is indicated in FIG. 46A and FIG. 46B. When a recognition model is produced from the shape model 219a1 displayed on the screen, if both of the adjoining line segments 219b2 and 219b3 within a single loop 219b1 are allocated along the same direction but opposite direction, then a loop cannot be constituted but no recognition model cannot be produced. In such a case, the widths of all line segments for constituting an error loop 219b1 are displayed to be wider than those of other line segments and displayed in different colors based upon the allocation direction information as shown in FIG. 46B. At this time, as a means for announcing this error line segment to the system user, not only the width of the error line segment is varied, but also this error line may be flickered, the sort thereof may be changed, the color thereof may be varied, or this error line may be indicated by an arrow. At the same time, the reason why the error line segment has been displayed to have the wider width is indicated as such a message as in 219b4. As the sorts of errors, there may be the following reasons. That is, "All of line segment allocation directions within a loop are identical to each other"; "A line segment allocation direction for only one line segment in a loop is different from others"; and "Three axial (x, y, z) directions are mixed within a loop".

In order to produce such a recognition model topologically equal, and not contradictory to the shape model, the system user picks a line segment whose allocation direction is desirably altered in a similar manner to Operation 2), and then enters the alteration designating direction from the keyboard (corresponding to New Items 3) to 5)).

Figure 47:
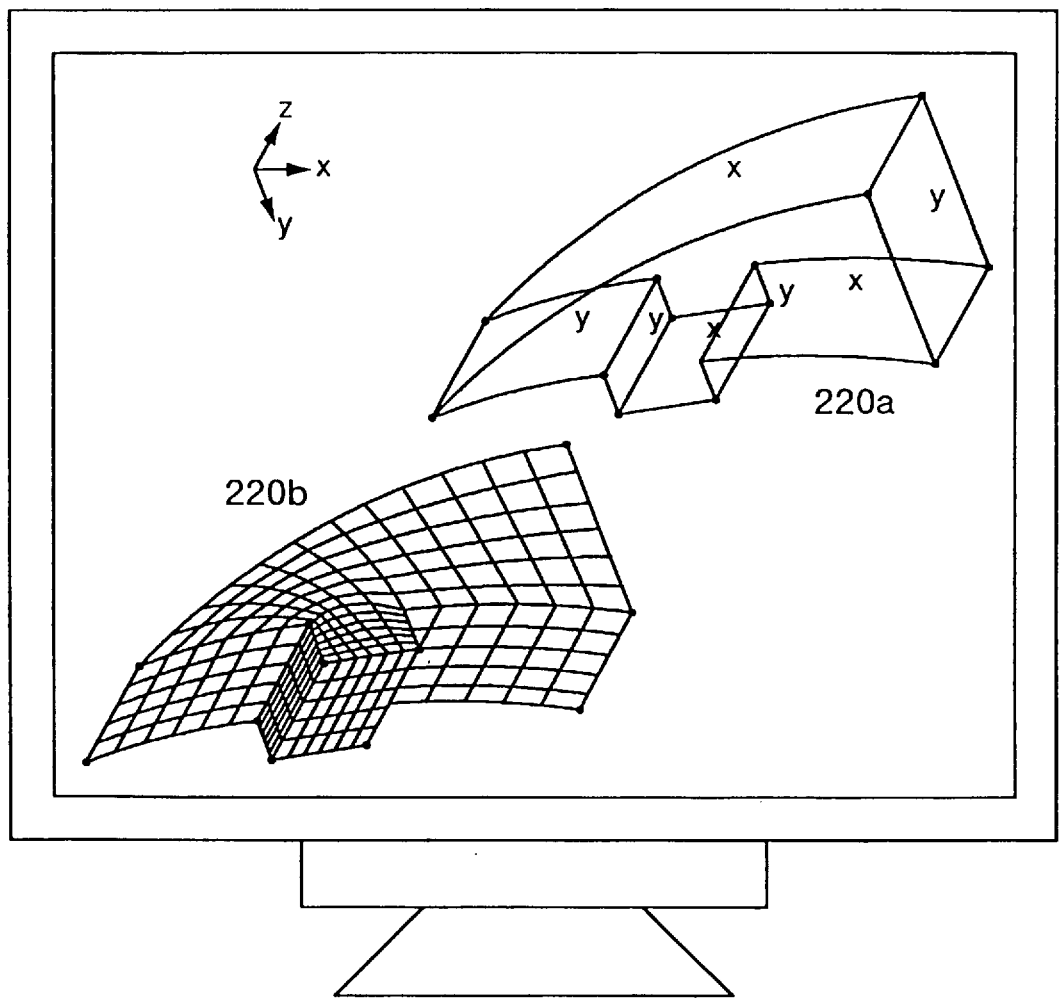
FIG. 47 represents a condition for displaying a finite element model whose line segment allocation direction has been modified.

Operation 4). From the recognition model generated by way of the above-explained operations, a finite element model is produced and then displayed on the screen. At this time, as represented in FIG. 47, the allocation directions of the respective line segments indicated on the shape model 220a are simultaneously displayed on the screen.

Operation 5). The system user confirms the produced finite element shape and in the case where there is a portion not satisfying the requirement, the user selects a command indicated in the menu, or inputs the command, so that the operation is returned to Operation 3). Then, the line segment allocation direction may be changed, and the finite element model may be reproduced as the altered recognition model.

Figure 48:
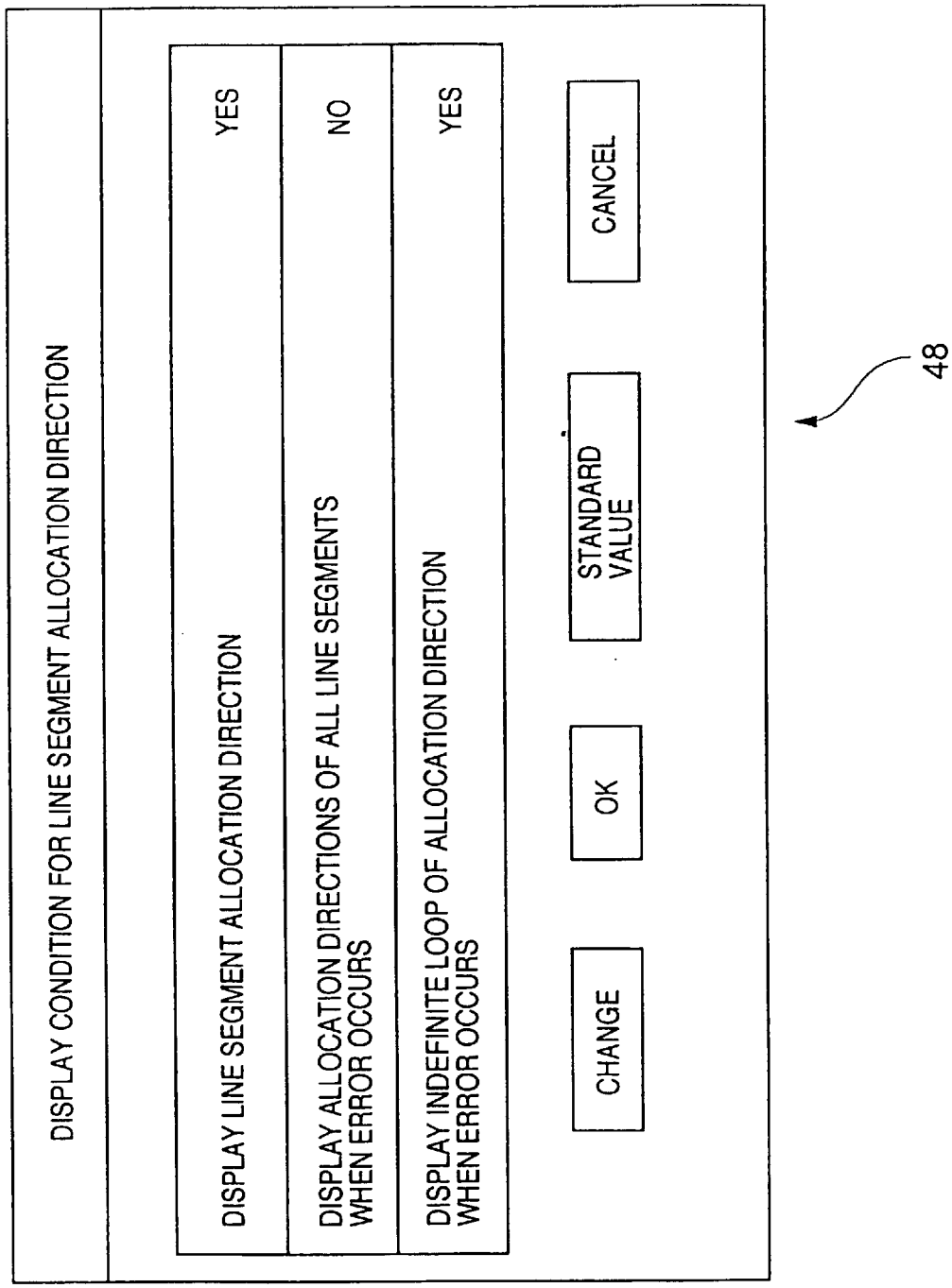
FIG. 48 is a diagram for indicating a menu used to select line segment allocation direction display information.
Figure 49:
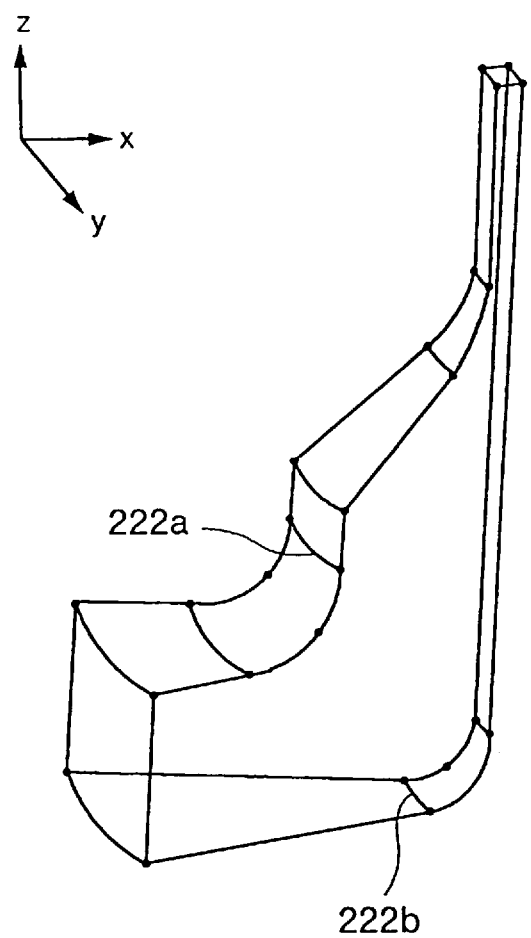
FIG. 49 is an illustration for showing an example of a shape model used to explain a constraint effect of a line segment allocation direction.

It should also be noted that such portions where the line segment allocation directions are indicated in different colors, and the width of the error line segment is made wide and displayed in different colors may be selected by the menu form 48 shown in FIG. 48.

The sequential operation as described above and similar to the system user initiation method may be applied not only to the producing stage of the recognition model, but also to the initial stage to produce the mapping model and to the respective stages within the system. The generation of the finite element mesh may be controlled at the respective stages.

The above-described functions are added, so that the shape of the recognition model can be controlled, so that the arrangements of the elements can be changed from FIG. 40 to FIG. 42. When the finite element model of FIG. 40 is changed into that of FIG. 42, both shapes of the recognition model (and the mapping model) are changed from FIG. 39 to FIG. 41. In this case, in the processing stage of the above-described sequence (Operation 2), the allocation directions of the line segments 211a to 211h for the shape model shown in FIG. 38 are constrained along the same direction, so that the recognition model (mapping model) 41 indicated in FIG. 41 can be produced, and the finite element model required by the system user can be produced.

Figure 50:
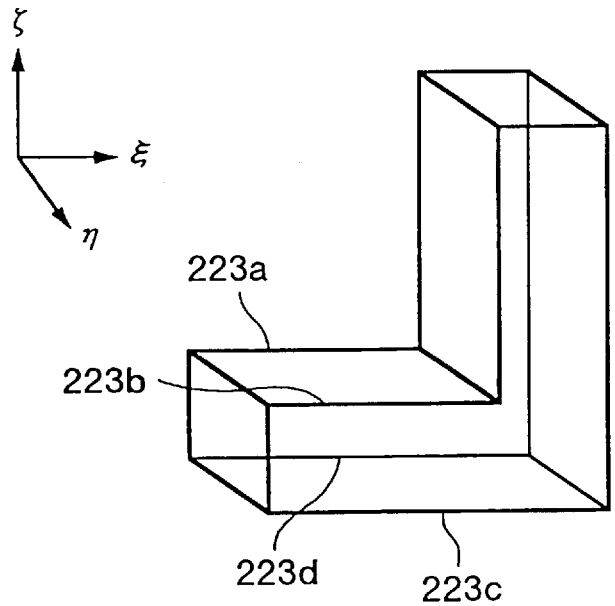
FIG. 50 is an illustration for indicating a recognition model automatically generated from the shape model of FIG. 49.
Figure 51:
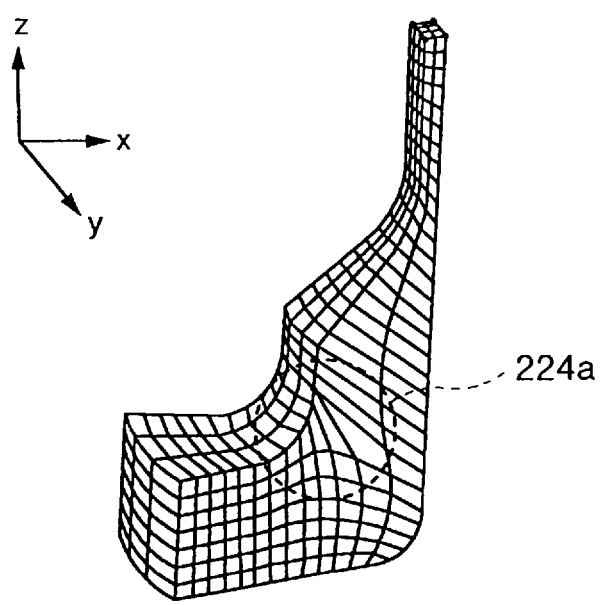
FIG. 51 is an illustration of a finite element model having large distortion, automatically generated based on the recognition model of FIG. 50.

As another example, FIG. 49 to FIG. 53 represent an embodiment for reducing distortion of elements. When the basic automatic element producing system is applied to the shape model of FIG. 49, a direction is changed by 90° with respect to line segments 222a and 222b as a boundary, so that an L-shaped recognition model as shown in FIG. 50 is generated. If a finite element model is produced based on the recognition model, this finite element model becomes such a model as indicated in FIG. 51, in which distortion of an element of a portion indicated by 224a becomes large. As one method for reducing this distortion, such constraint may be made in such a way that all of the line segments 223a to 223d of FIG. 50 in a similar operation (Operation 2) are allocated along the $\zeta$ axial direction. Thus, all of the allocation directions of the line segments 223a to 223d are constrained along the $\xi$ axial direction of the mapping space constructed of the $\xi$, $\eta$, $\zeta$ axes. As a result, the line segments 223a to 223d are allocated and modified along the direction of the line segments 225a to 225d shown in FIG. 52, and an I-shaped recognition model can be produced, so that a finite element model 53 of FIG. 53 whose distortion is reduced can be generated.

Figure 52:
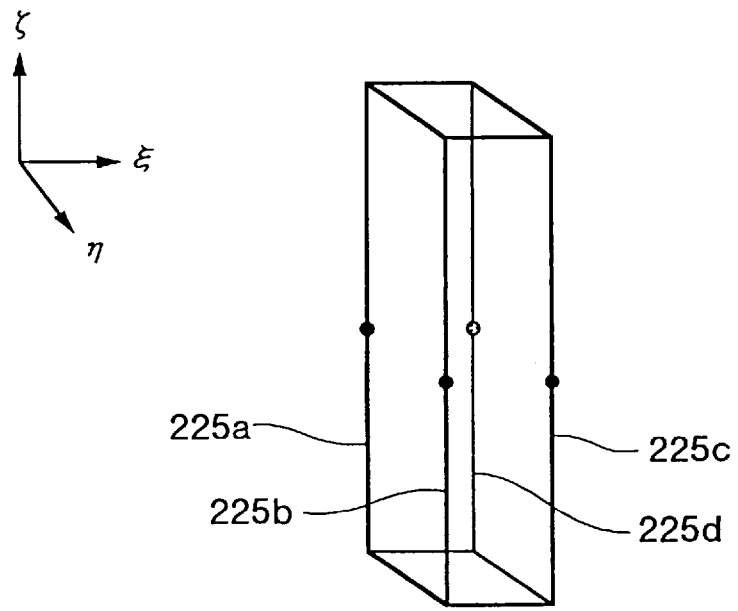
FIG. 52 is an illustration for indicating another recognition model producible from the shape model of FIG. 49, whose line segment allocation direction is different from that of FIG. 50.
Figure 53:
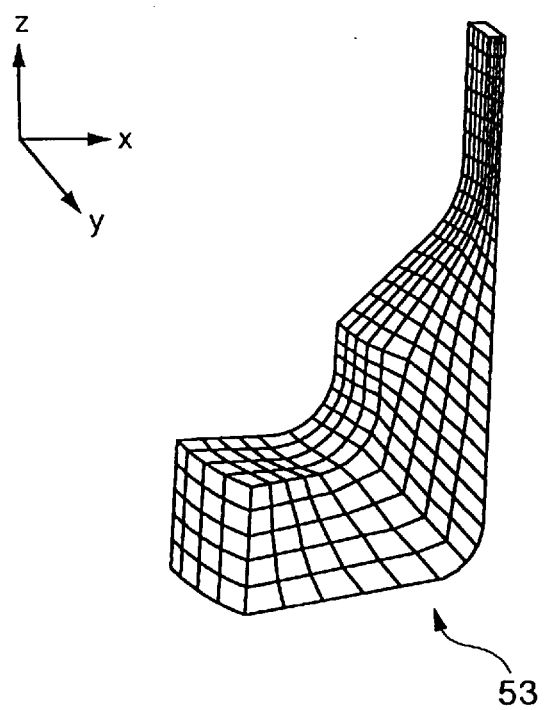
FIG. 53 is an illustration for showing a finite element model having small distortion, automatically generated based on the recognition model of FIG. 52.

The above-explained two alteration examples of the finite element models from FIG. 40 to FIG. 42 and from FIG. 51 to FIG. 53 correspond to such application examples that the arrangement and shape of the elements once automatically produced are optimized.

On the other hand, such an example shown in FIGS. 46A, 46B and FIG. 47, will now be explained in detail, in which the allocation direction is modified to a model which can not be produced because the topological equivalence with the shape model can be no longer maintained at the line segment allocation determining stage of the automatic element producing system, no recognition model can be generated, and as a result, a finite element model can not be produced.

Figure 54:
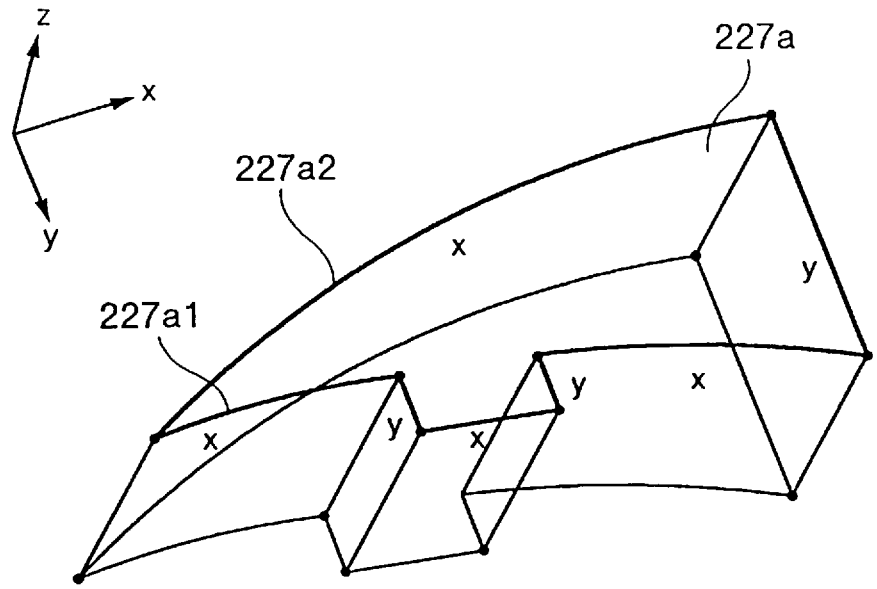
FIG. 54 is an illustration for representing an example of a shape model by which a recognition model could not be produced, because a line segment allocation direction could not be determined.

When the basic system is applied to a shape model of FIG. 54, to allocate the directions of the respective line segments, since the line segments 227a1 and 227a2 of the shape model are allocated along the x axial direction and along the opposite directions, the shape of the loop 227a cannot be constituted in the stage to produce the recognition model, but the recognition model cannot be produced.

Figure 55:
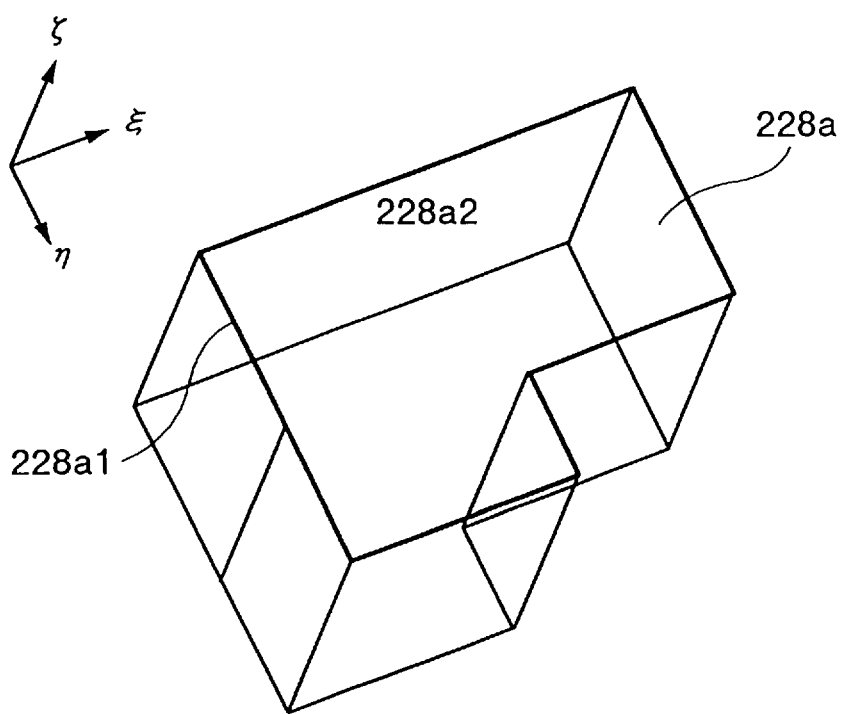
FIG. 55 is an illustration for indicating a recognition model generated after to line segment allocation direction has been modified.
Figure 56:
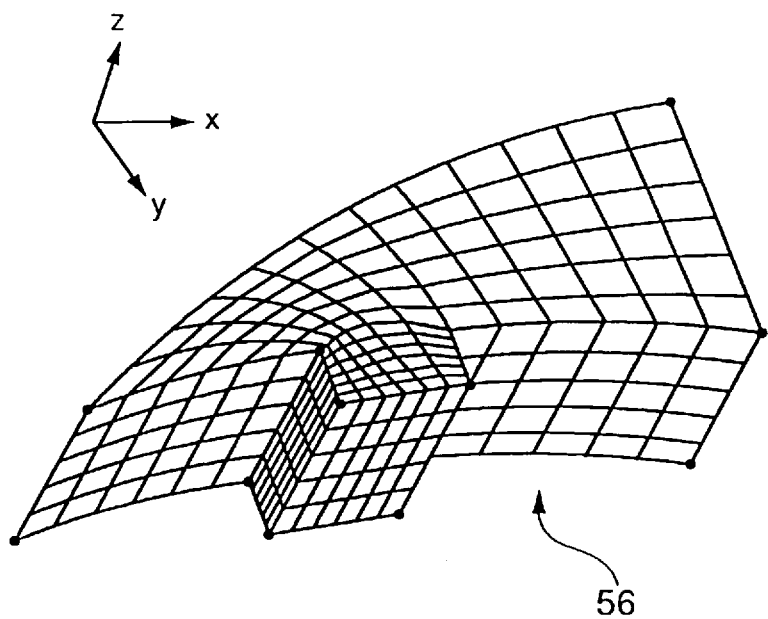
FIG. 56 is an illustration for showing a finite element model automatically generated based on the recognition model of FIG. 55.

In this case, the loop 227a causing the error is displayed in highlight mode by the above-described process operation (Operation 4), and the directions are displayed in different colors. Therefore, based on this information, the system user again designates the allocation direction of the line segment 227a1 from the x axial direction to the y axial direction, as shown in 228a1 of FIG. 55 (in the case of the mapping space constructed by the $\xi$, $\eta$, $\zeta$ axes, the allocation direction is designated from the $\xi$ axial direction to the $\zeta$ axial direction). Therefore, a loop 228a of FIG. 55 may be constructed, and a recognition model can be produced. Based upon the above-produced recognition model of FIG. 55, a finite element model 56 indicated in FIG. 56 can be produced.

Since the finite element method is employed in the numerical analysis mesh producing method according to this embodiment, the generated mesh can become such an element shape which is fitted to the shape to be analyzed, and is arranged in a regular manner, and also has small distortion. Since the mesh is constructed by employing only the hexahedron elements, the analysis precision becomes high.

It should be noted that although the various examples used in the finite element method have been described in this embodiment, the present invention is not limited only to the finite element method, but to other mesh arrangement controlling methods used for numerical analyses such as the difference calculus, the finite volume method, and the boundary element method.

We claim:

1. A method for dividing a shape expressed in a three-dimensional space into elements, said method comprising the steps of:

producing, from a shape model indicative of a shape expressed in a three-dimensional space and stored in storage means, an intermediate model including a set of unit blocks, corresponding to said shape model;

inputting, through input means, data used to modify a gathered state of said unit blocks of said intermediate model;

modifying said intermediate model by modifying said gathered state of said unit blocks of said intermediate model in response to said input data; and producing a mesh to said shape model such that arrangement relationships of adjoining unit blocks are identical to each other with respect to all of said unit blocks of said modified intermediate model.

2. An element dividing method as claimed in claim 1, wherein:

the number of unit blocks of said intermediate model along a preselected direction is changed in response to said data.

3. An element dividing method as claimed in claim 1, wherein:

an arranging direction of said unit blocks of said intermediate model is changed in response to said data.

4. A method for dividing a shape expressed in a three-dimensional space into elements, said method comprising the steps of:

producing, from a shape model indicative of a shape expressed in a three-dimensional space and stored in storage means, an intermediate model having a set of unit blocks, corresponding to said shape model;

when an interference portion is produced in said intermediate model in a stage of said producing an intermediate model step, displaying said produced intermediate model on a display screen;

inputting through input means, data used to modify a gathered state of said unit blocks of said intermediate model;

modifying said intermediate model and the display of said intermediate model by modifying said gathered state of said unit blocks of said intermediate model in response to said input data; and producing a mesh to said shape model such that arrangement relationships of adjoining unit blocks are identical to each other with respect to all of said unit blocks of said modified intermediate model.

5. An element dividing method as claimed in claim 4, wherein:

the number of unit blocks of said intermediate model along a preselected direction is changed in response to said data.

6. A method for dividing a shape expressed in a three-dimensional space into elements, said method comprising the steps of:

producing, from a shape model indicative of a shape expressed in the three-dimensional space and stored in storage means, an intermediate model having a set of unit blocks, corresponding to said shape model;

when production of the intermediate model fails at a stage of said producing an intermediate model step, displaying said shape model on a display screen;

inputting, through input means, data used to modify a gathered state of said unit blocks of said intermediate model;

modifying said intermediate model by modifying said gathered state of said unit blocks of said intermediate model in response to said input data; and producing a mesh to said shape model such that arrangement relationships of the adjoining unit blocks are identical to each other with respect to all of said unit blocks of said modified intermediate model.

7. An element dividing method as claimed in claim 6, wherein:

an arranging direction of the unit blocks of said intermediate model is changed in response to said data.

8. An apparatus for dividing a shape expressed in a three-dimensional space into elements, comprising:

storage means for storing a shape model indicative of said shape expressed in the three-dimensional space;

means for producing, from said shape model stored in said storage means, an intermediate model having a set of unit blocks and corresponding to said shape model;

input means for inputting data used to change a gathered state of said unit blocks of said intermediate model;

means for modifying said intermediate model by changing the gathered state of said unit blocks of said intermediate model in response to said input data; and means for producing a mesh on said shape model such that, regarding all of said unit blocks constituting said modified intermediate model, arrangement relationships of adjoining unit blocks are identical to each other.

9. An element dividing apparatus as claimed in claim 8, wherein:

said intermediate model modifying means changes the number of unit blocks of said intermediate model along a preselected direction in response to said data.

10. An element dividing apparatus as claimed in claim 8, wherein:

said intermediate model modifying means changes an arranging direction of the unit blocks of said intermediate model in response to said data.

11. An apparatus for dividing a shape expressed in a three-dimensional space into elements, comprising:

storage means for storing a shape model indicative of a shape expressed in the three-dimensional space;

means for producing, from the shape model indicative of a shape expressed in the three-dimensional space stored in said storage means, an intermediate model having a set of unit blocks and corresponding to said shape model;

means, when said intermediate model producing means produces an interference portion in a stage of producing said intermediate model, for displaying said produced intermediate model on a display screen of a display apparatus;

input means for inputting data used to change a gathered state of said unit blocks of said intermediate model;

means for modifying said intermediate model and the display of said intermediate model by changing the gathered state of unit blocks of said intermediate model in response to said input data; and means for producing a mesh on said shape model such that, regarding all of said unit blocks of said modified intermediate model, arrangement relationships of the adjoining unit blocks are identical to each other.

12. An element dividing apparatus as claimed in claim 11, wherein:

said intermediate model modifying means changes the number of unit blocks of said intermediate model along a preselected direction in response to said data.

13. An apparatus for dividing a shape expressed in a three-dimensional space into elements, comprising:

storage means for storing a shape model indicative of a shape expressed in the three-dimensional space;

means for producing, from the shape model indicative of a shape expressed in the three-dimensional space stored in said storage means, an intermediate model having a set of unit blocks and corresponding to said shape model;

means, when said intermediate model producing means fails to produce an intermediate model in a stage of producing said intermediate model, for displaying said shape model on a display screen of a display apparatus;

input means for inputting data used to change a gathered state of said unit blocks of said intermediate model;

means for modifying said intermediate model and the display of said intermediate model by changing the gathered state of said unit blocks of said intermediate model in response to said input data; and means for producing a mesh on said shape model such that, regarding all of said unit blocks of said modified intermediate model, arrangement relationships of the adjoining unit blocks are identical to each other.

14. An element dividing apparatus as claimed in claim 13, wherein:

said intermediate model modifying means changes an arranging direction of said unit blocks of said intermediate model in response to said data.

15. A finite element model producing method comprising the steps of:

inputting a shape model as an object to be analyzed and division information used to produce a finite element mesh;

producing a recognition model such that an edge line of said shape model is allocated in any coordinate axial direction in an orthogonal coordinate system and connection relationships of edge lines are equal to those of said shape model;

producing a mapping model wherein orthogonal lattices are generated on a surface of said recognition model and an inside thereof; and mapping lattice points of the surface and the inside of said mapping model onto said shape model to thereby generate a finite element model;

wherein the generated mapping model is displayed on a screen, and said mapping model is modified in an interactive operation so that production of the finite element mesh is controlled.

16. A finite element model producing method as claimed in claim 15, wherein:

an interference portion of the produced mapping model is displayed in a highlight mode.

17. A finite element model producing method as claimed in claim 15, wherein:

the generated mapping model is displayed on the screen, an edge line of said mapping model is designated, and a dividing element number of said edge line is entered so that coarse/fine characteristics of the mesh are modified.

18. A finite element model producing method as claimed in claim 15, wherein:

the generated mapping model is displayed on the screen, an edge line of said mapping model is designated, and an increased/decreased value of a dividing element number of said edge line is entered so that coarse/fine characteristics of the mesh are modified.

19. A finite element model producing method comprising the steps of:

inputting a shape model as an object to be analyzed and division information used to produce a finite element mesh;

producing a recognition model such that an edge line of said shape model is allocated in any coordinate axial direction in an orthogonal coordinate system, and connection relationships of edge lines are equal to those of said shape model;

producing a mapping model wherein orthogonal lattices are generated on a surface of said recognition model and an inside thereof;

displaying the produced mapping model on a display screen;

modifying said mapping model in an interactive operation to thereby control a finite element mesh; and mapping lattice points of a surface and an inside of the corrected mapping model on said shape model to thereby generate a finite element model.

20. An apparatus for designing a mechanical component, comprising:

means for producing a shape model to be analyzed;

means for inputting division information used to generate a finite element mesh;

means for producing a recognition model such that each edge line of said shape model is allocated in any coordinate axial direction in an orthogonal coordinate system and connection relationships of edge lines are equal to those of said shape model;

means for producing a mapping model wherein orthogonal lattices are generated on a surface of said recognition model and an inside thereof;

means for displaying the produced mapping model on a display screen;

means for modifying said mapping model in an interactive operation to thereby control a finite element mesh; and means for mapping lattice points of a surface and an inside of the corrected mapping model on said shape model to thereby generate a finite element model.

21. An element dividing method as claimed in claim 1, wherein:

both of said intermediate model and said mesh-formed shape model are displayed on a same screen of a display device.

22. An element dividing apparatus as claimed in claim 8, wherein:

both of said intermediate model and said mesh-formed shape model are displayed on a same screen of a display device.

23. A method for producing a model used for numerical analysis, said method comprising the steps of:

entering both of data of a shape model as an object to be analyzed and division control data for producing a mesh for numerical analysis of the object to be analyzed;

generating a recognition model which corresponds to an approximated shape model such that each line segment of said shape model is allocated to any one of coordinate axial directions in an orthogonal coordinate system;

producing a mapping model wherein an orthogonal lattice is produced on at least a surface of said recognition model; and producing a model for numerical analysis wherein lattice points of said mapping model are mapped on said shape model;

wherein a system user initiates at least one of said production stages for said respective models, so that the model can be modified.

24. A method for producing a mesh used for numerical analysis as claimed in claim 23, wherein:
a mapping model is produced wherein orthogonal lattices are generated on the surface and an inside thereof.

25. A method for producing a mesh used for numerical analysis as claimed in claim 23, wherein:
before said system determines a division parameter used at each of the model producing stages in said mesh producing method, said system user intervenes to constrain said division parameter and/or while said division parameter is determined, or, after said division parameter has been determined, to be able to change said division parameter.

26. A method for producing a mesh used for numerical analysis as claimed in claim 23, wherein:
when said recognition model is produced by said system, before an allocation direction of a line segment which is a division parameter required for generating said recognition model is produced, the recognition model is generated along a direction constrained by the system user and/or a shape of a recognition model is confirmed which is generated while a decision is made of the allocation directions for all of the line segments, or after the allocation directions of all line segments have been determined, and thereafter a portion, or all of said line segment allocation directions are changed to reproduce said recognition model.

27. A method for producing a mesh used for numerical analysis as claimed in claim 25, wherein:
a change of said division parameter at each stage is realized by an interactive operation.

28. A method for producing a mesh used for numerical analysis as claimed in claim 26, wherein:
the allocation directions of the respective line segments of the shape model to be analyzed are displayed on the shape model of the display screen, while varying sorts of the segment lines, which the system user can discriminate, whereby the change of the allocation direction is assisted.

29. A method for producing a mesh used for numerical analysis as claimed in claim 25, wherein:
when the line segments of the shape model are allocated along directions of the orthogonal coordinate system in order to produce the recognition model, such a line segment which could not be determined because of a failure of direction allocation is displayed while being distinguishable from other line segments.

30. In a mesh producing apparatus for automatically dividing a shape into only hexahedron elements by way of a mapping method, a mesh generating apparatus for numerical analysis comprising:
means for discriminating a line segment of a shape model that could not be automatically allocated to a mapping model, from other allocatable line segments; and
means for displaying said line segment, which could not be automatically allocated to a mapping model, distinguishable from said other allocatable line segments.

31. A method for producing a mesh used for numerical analysis as claimed in claim 25, wherein:
said system includes means for modifying an arrangement and a shape of the mesh by displaying the determined line segment allocation directions on the shape model of the screen, and for designating a line segment of said shape model to constrain and/or specify the allocation direction of the designated line segment.

32. A method for producing a model for numerical analysis, said method comprising the steps of:
inputting a shape model as an object to be analyzed and division information used to produce a mesh for numerical analysis;
producing a recognition model, after not only a value automatically determined by a system but also a value previously designated by a user of the system can be used, at a stage for generating said recognition model produced by allocating line segments of said shape model to any one of coordinate axial directions of the orthogonal coordinate system, and/or displaying said allocation directions on a screen;
after the shape of the recognition model is controlled by changing said allocation direction by the system user in an interactive operation, producing a mapping model wherein an orthogonal lattice is produced on at least a surface of the modified recognition model; and
mapping at least lattice points on the surface of said mapping model on said shape model to thereby produce a model used for numerical analysis.

33. An apparatus for producing a mesh used for numerical analysis, comprising:
means for producing a shape model as an object to be analyzed;
means for inputting division information used to generate a mesh for numerical analysis of said object to be analyzed;
means for producing a recognition model equal to an approximation shape obtained by allocating each of line segments of said shape model to any coordinate axial direction of the orthogonal coordinate system;
means for displaying the allocation direction determined in said recognition model;
means for modifying the shape of the recognition model by constraining and/or changing said allocation direction in an interactive operation;
means for producing a mapping model wherein an orthogonal lattice is generated on at least a surface of the corrected recognition model;
means for producing a numeral value analyzing model by mapping at least lattice points generated on the surface of said mapping model on said shape model; and
means for returning to said means for producing said recognition model after the model for numerical analysis has been formed.

34. A method for producing a mesh used for numerical analysis as claimed in claim 31, wherein:
a mapping model wherein orthogonal lattices are generated on a surface and an inside thereof is produced.

35. A method for producing a model for numerical analysis comprising the steps of:
entering data of a of shape model as an object to be analyzed and division control data used to produce a finite element model of the object to be analyzed;
producing a recognition model which corresponds to an approximated shape model obtained by allocating each of line segments of said shape model to any coordinate axial direction in the orthogonal coordinate system;
producing a mapping model in which an orthogonal lattice is generated on a surface of said recognition model and an inside thereof; and producing a model for numerical analysis is produced in which lattice points of said mapping model are mapped on said shape model, wherein a finite element mesh producing method is performed in which a system user intervenes into at least one of said model producing stages, whereby the model can be modified.

36. In a mesh producing apparatus for automatically dividing a shape into only hexahedron elements by way of a mapping method, a mesh generating apparatus for numerical analysis comprising:

means for discriminating a line segment of a shape model that could not be automatically allocated to a mapping model, from other allocatable line segments; and means for displaying said line segments, which could not be automatically allocated to a mapping model, distinguishable from said other allocatable line segments in terms of color.

37. In a mesh producing apparatus for automatically dividing a shape into only hexahedron elements by way of a mapping method, a mesh generating apparatus for numerical analysis comprising:

means for discriminating a line segment of a shape model that could not be automatically allocated to a mapping model, from other allocatable line segments; and means for displaying said line segments, which could not be automatically allocated to a mapping model, distinguishable from said other allocatable line segments in terms of line type.

* * * * *